(12) United States Patent
Hashimoto et al.

(10) Patent No.: US 8,505,941 B2
(45) Date of Patent: Aug. 13, 2013

(54) TORSION BEAM MANUFACTURING METHOD AND TORSION BEAM

(75) Inventors: Yuji Hashimoto, Aichi (JP); Shunsuke Toyoda, Aichi (JP); Kinya Nakagawa, Hiroshima (JP); Koji Suzuki, Kanagawa (JP); Yoshikazu Kawabata, Aichi (JP); Osamu Sonobe, Chiba (JP); Akio Sato, Kanagawa (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 13/260,828

(22) PCT Filed: Mar. 31, 2010

(86) PCT No.: PCT/JP2010/056286
§ 371 (c)(1),
(2), (4) Date: Nov. 29, 2011

(87) PCT Pub. No.: WO2010/114173
PCT Pub. Date: Oct. 7, 2010

(65) Prior Publication Data
US 2012/0104717 A1 May 3, 2012

(30) Foreign Application Priority Data

Apr. 1, 2009 (JP) .................................. 2009-088907
Mar. 18, 2010 (JP) .................................. 2010-061753

(51) Int. Cl.
*B21D 31/00* (2006.01)

(52) U.S. Cl.
USPC ............... 280/124.166; 280/124.106; 72/369; 72/370.23; 72/411; 29/897.2

(58) Field of Classification Search
USPC .................... 280/124.166, 124.106, 124.116; 72/60, 367.1, 369, 370.23, 411; 29/421.1, 29/897.2
See application file for complete search history.

(56) References Cited

U.S. PATENT DOCUMENTS

| | | | | |
|---|---|---|---|---|
| 6,487,886 | B2 * | 12/2002 | Ueno et al. ......................... | 72/57 |
| 6,523,841 | B2 * | 2/2003 | Glaser et al. ........... | 280/124.106 |
| 7,257,982 | B2 * | 8/2007 | Park ............................... | 72/398 |
| 7,377,041 | B2 * | 5/2008 | Ok et al. ....................... | 29/897.2 |
| 2001/0022099 | A1 * | 9/2001 | Ueno et al. ......................... | 72/57 |
| 2004/0256828 | A1 * | 12/2004 | Han et al. ............... | 280/124.106 |
| 2007/0069496 | A1 * | 3/2007 | Rinehart et al. ........ | 280/124.166 |
| 2009/0071220 | A1 | 3/2009 | Gillet et al. | |

FOREIGN PATENT DOCUMENTS

| | | | |
|---|---|---|---|
| FR | 2 891 480 A1 | 4/2007 | |
| JP | 2001-321846 A | 11/2001 | |
| JP | 2002-275538 A | 9/2002 | |
| JP | 2005-289258 A | 10/2005 | |
| JP | 2007-237784 A | 9/2007 | |
| JP | 2008-169455 A | 7/2008 | |
| JP | 2009-509774 A | 3/2009 | |

* cited by examiner

*Primary Examiner* — Drew Brown
*Assistant Examiner* — Timothy Wilhelm
(74) *Attorney, Agent, or Firm* — DLA Piper LLP (US)

(57) ABSTRACT

A method enhances fatigue strength of ear portions which are high fatigue risk parts in a torsion beam almost without bringing about disadvantages in terms of productivity and cost. A torsion beam is formed with a portion of the tubular body into an approximately U-shape in cross section by crushing the portion of the tubular body in the radial direction and, thereafter, due to bending with a bottom line set as a belly side of bending, a bending strain of 2 to 6% in the tube longitudinal direction on a tensile side is imparted to the ear portions.

18 Claims, 16 Drawing Sheets

A-A CROSS-SECTIONAL SHAPE

FIG. 5
(a)
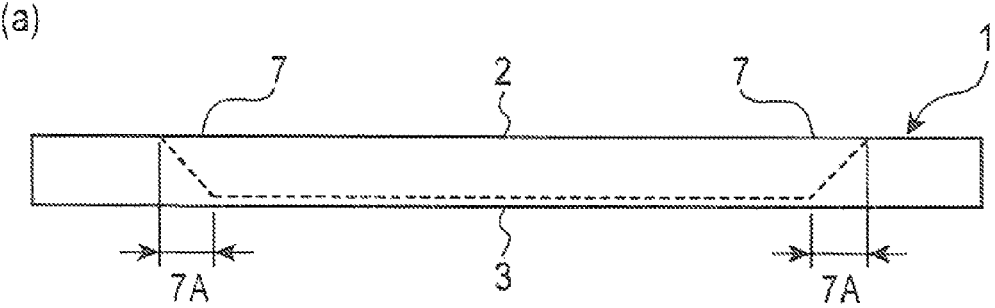
(b)
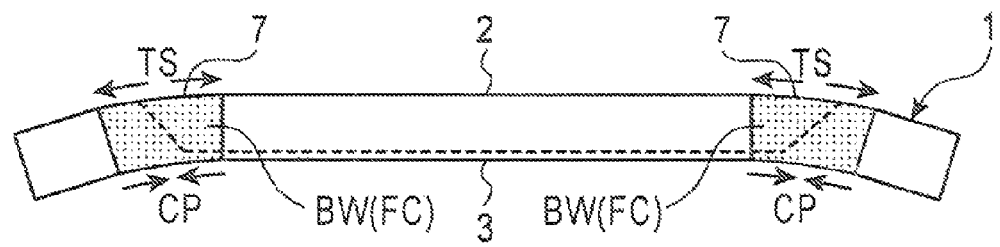

FIG. 7
(a)
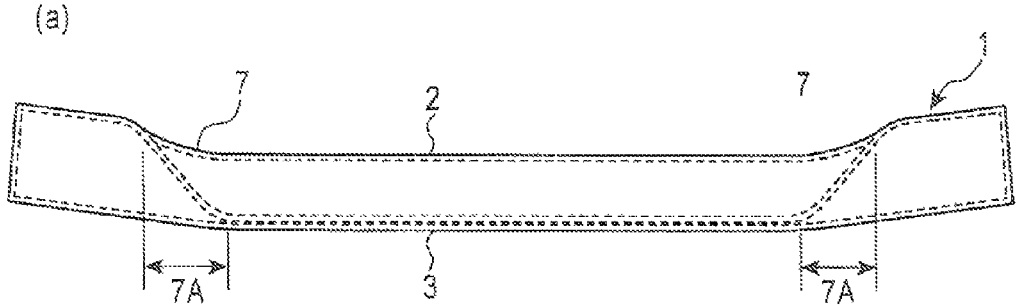
(b)
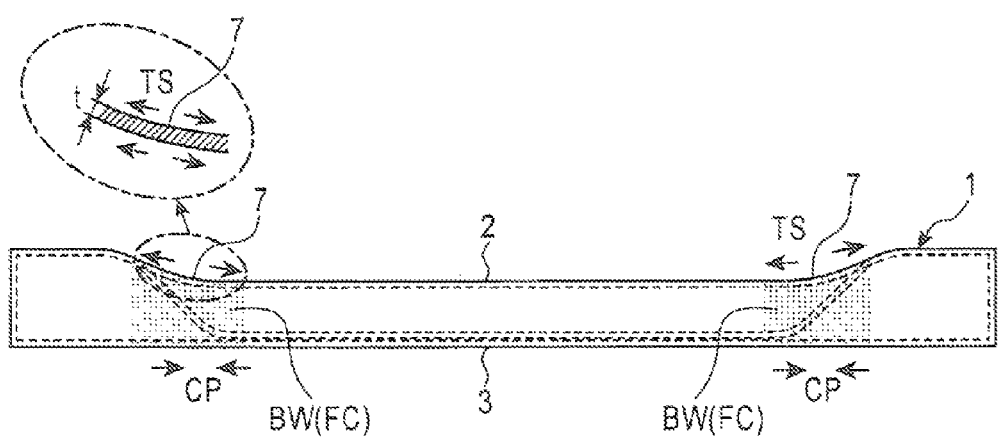

FIG. 8
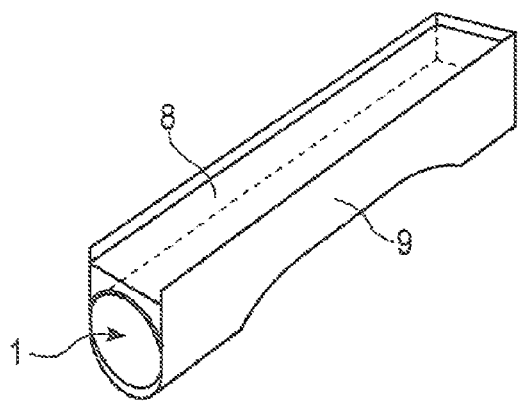
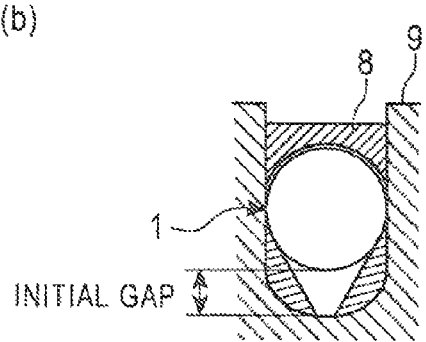
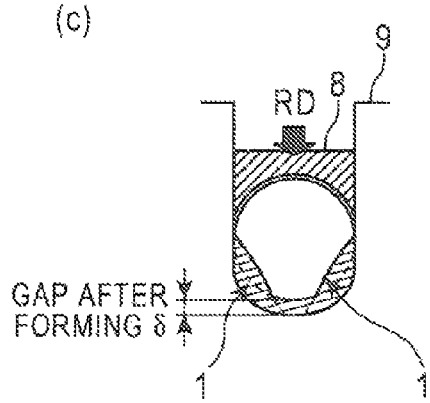
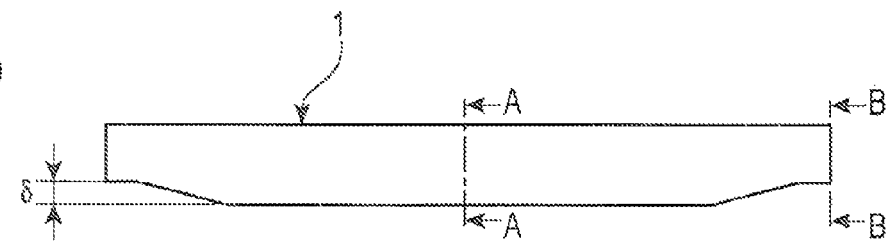

FIG. 11
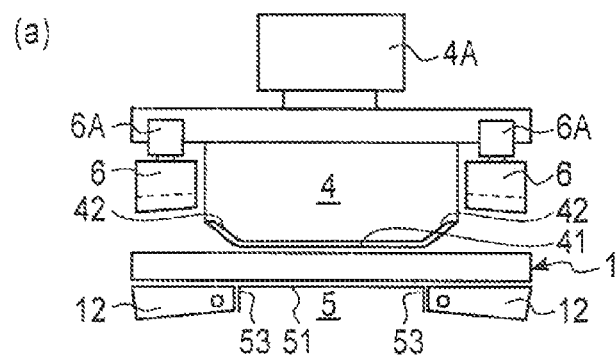
(a)
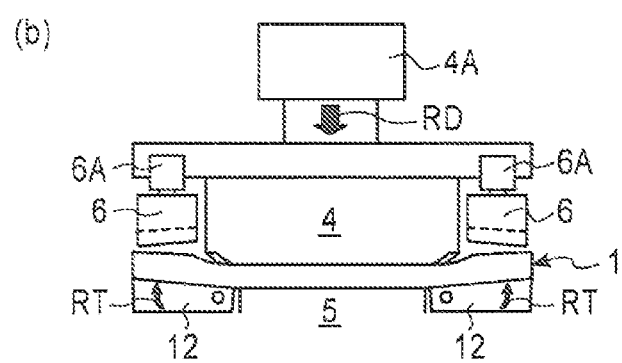
(b)
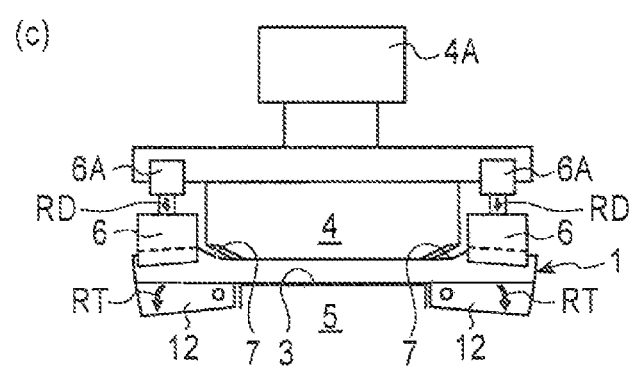
(c)
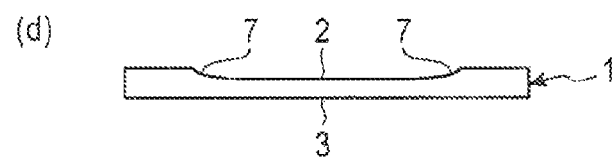
(d)

FIG. 12
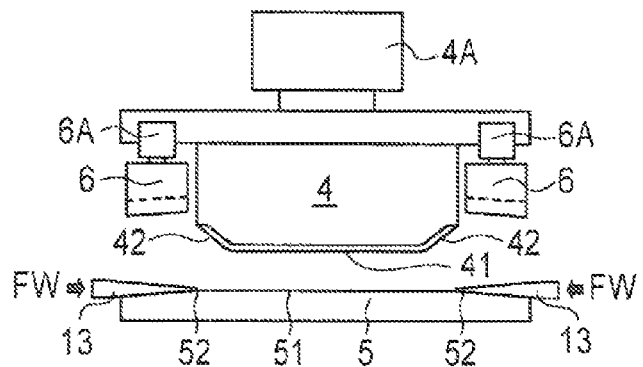
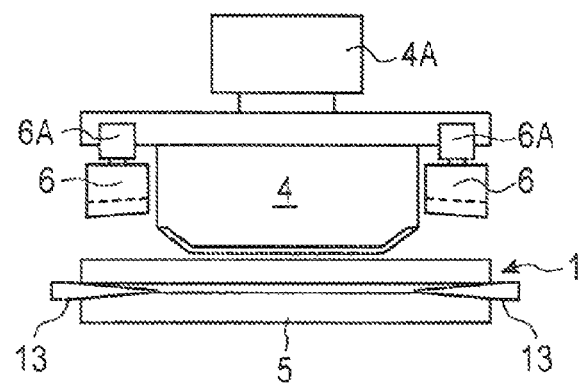
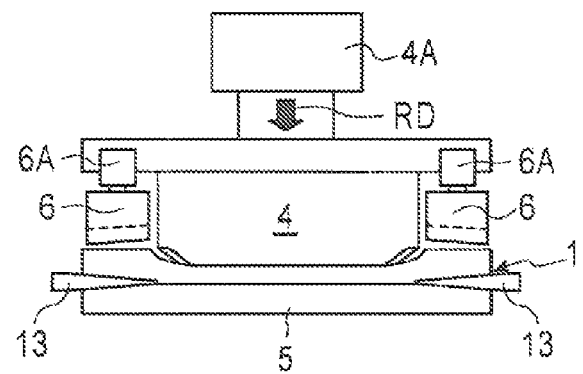

TORSION BEAM MANUFACTURING METHOD AND TORSION BEAM

RELATED APPLICATIONS

This is a §371 of International Application No. PCT/JP2010/056286, with an international filing date of Mar. 31, 2010 (WO 2010/114173 A1, published Oct. 7, 2010), which is based on Japanese Patent Application Nos. 2009-088907, filed Apr. 1, 2009, and 2010-061753, filed Mar. 18, 2010, the subject matter of which is incorporated by reference.

TECHNICAL FIELD

This disclosure relates to a torsion beam manufacturing method and a torsion beam, and more specifically to a torsion beam manufacturing method where a tubular body which is a circular tube in a raw configuration is formed into a torsion beam having an approximately U-shape or V-shape in cross section by forming, and a torsion beam which is manufactured by the torsion beam manufacturing method.

BACKGROUND

To consider a case where a torsion beam is manufactured in such a manner that a tubular body is manufactured by a normal tube manufacturing method (a tube manufacturing method where the rolling direction of a rolled steel sheet is set to the tub axis direction) and a portion of the tubular body is crushed in the radial direction, there exists a possibility that wrinkles which extend in the tube axis direction (longitudinal direction) are generated on inner peripheral surfaces of edge portions of a crushed portion in the circumferential direction in cross section (hereinafter the edge portions being referred to as "ear portions" since the edge portions have a shape similar to an ear of a rabbit). These wrinkles become a source of fatigue crank initiation and deteriorate the endurance of the torsion beam. To overcome such a drawback, JP-A-2005-289258 proposed the use of a tubular body manufactured by setting the rolling direction of a rolled steel sheet approximately perpendicular to the axial direction of the tubular body as a tubular body provided for crushing and forming in the radial direction and/or the grinding of an inner periphery of the tubular body in the direction approximately perpendicular to the axial direction of the tubular body before or after manufacturing the tube.

JP-A-2002-275538, as a heat treatment method which enhances deformation strength and fatigue strength of car parts, proposes a method where torsion is applied to a steel material within a range where plastic deformation does not take place, heat treatment is applied to a portion to which a tensile stress is applied in such a torsion-applied state, and the torsion is released after cooling the steel material. Due to such a method, it is considered that the direction of the applied compressive residual stress can be easily aligned with the direction of a stress applied to the steel material during use and dimensional accuracy is enhanced due to the suppression of generations of strain in the steel material.

The above-mentioned background art is considered effective as a means which enhances the fatigue strength of the ear portion of the torsion beam which is a high risk part where fatigue crack initiations occur. In forming the portion of the tubular body into a cross section having an approximately U-shape (hereinafter referred to as an approximately U-shape in cross section) by crushing the portion in the radial direction, the ear portion is mainly subjected to bending in the circumferential direction. Hence, a residual stress on a tensile side occurs on a tubular inner surface of the ear portion in the circumferential direction, and this residual stress causes lowering of fatigue characteristics. Although the technique disclosed in JP '258 is the technique which focuses on wrinkles formed on the tubular inner surface which becomes a source of a fatigue crack initiation, the occurrence of wrinkles can be avoided by designing a shape of the ear portion having a slightly larger curvature radius without forming an ear shape having a small curvature radius by which wrinkles occur. A means which reduces a tensile residual stress in the tubular inner surface of the ear portion is important for the enhancement of fatigue characteristics.

However, in the technique disclosed in JP '258, it is necessary to set the rolling direction of the rolled steel sheet substantially perpendicular to the axial direction of the tubular body and/or to grind the inner periphery of the tubular body in the tubular circumferential direction which is the direction approximately perpendicular to the axial direction of the tubular body. In this case, compared to a usual case, the large restriction is imposed on a length of a manufactured tube or the addition of the grinding step is necessary or the like. Hence, there arises a drawback that the technique is disadvantageous in view of productivity and cost. Further, compared to a usual case, the technique disclosed in JP '538 requires the addition of steps such as applying torsion and heat treatment. Hence, the technique also has a drawback that it is disadvantageous in view of productivity and cost in the same manner.

SUMMARY

We provide a means which can overcome the above-mentioned drawbacks, and can enhance fatigue strength of an ear portion which is a high risk part of the fatigue crack initiation in a torsion beam almost without bringing about disadvantages in terms of productivity and cost.

We thus provide:

(1) A torsion beam manufacturing method being characterized in that, in manufacturing a torsion beam by forming a tubular body, a portion of the tubular body is formed into an approximately U-shape in cross section or a shape having an approximately V shape in cross section (hereinafter referred to as an approximately V-shape in cross section) by crushing the portion of the tubular body in the radial direction and, thereafter, the tubular body is bent with a bottom line of the tubular body set as the inner side of bending so that a bending strain of 2 to 6% in the tube longitudinal direction on a tensile side is imparted to ear portions.

(2) In the above-mentioned torsion beam manufacturing method (1), using a vertically movable ship-bottom-shaped upper die where tapered portions which are inclined upward (hereinafter referred to as upward tapered portions) are contiguously formed with both ends of a horizontal portion of the upper die (hereinafter referred to as an upper horizontal portion), upper clamps which are arranged on both end sides of the upper die in a vertically movable manner, and a fixed lower die where tapered portions which are inclined downward (hereinafter referred to as downward tapered portions) are contiguously formed with both ends of a horizontal portion of the lower die (hereinafter referred to as an lower horizontal portion), a portion of the tubular body is formed into an approximately U-shape in cross section or an approximately V-shape in cross section by crushing the portion of the tubular body in the radial direction by the upper die and the lower die and, thereafter, both tube end portions are clamped and bent by the upper clamps and the downward tapered portions of the lower die with the bottom line set as the inner side of bending and, due to the bending, a bending strain of 2 to 6% in the tube longitudinal direction on a tensile side is imparted to the ear portions of boundary portions between crushed portions and non-crushed portions (portions which are gradually changed, hereinafter referred to as gradually changing portions).

(3) In the above-mentioned torsion beam manufacturing method (1) or (2), a tube longitudinal center portion of the tubular body is preliminarily formed into a shape whose cross section has an inverted triangle shape (hereinafter referred to as an approximately inverted-triangular-shape in cross section) and, at the same time, preshaping which applies warp deformation to tube ends in the direction that a bottom of the portion formed into an approximately V-shape in cross section projects downward is performed and, thereafter, using the vertically movable ship-bottom-shaped upper die where the upward tapered portions are contiguously formed with both ends of the upper horizontal portion, the upper clamps which are arranged on both end sides of the upper die in a vertically movable manner, and the fixed lower die where the downward tapered portions are contiguously formed with both ends of the lower horizontal portion, a portion of the tubular body is formed into an approximately U-shape in cross section or an approximately V-shape in cross section by crushing the portion of the tubular body in the radial direction by the upper die and the lower die and, thereafter, both tube end portions are clamped and bent by the upper clamps and the downward tapered portions of the lower die with the bottom line set as the inner side of bending and, due to the bending, a bending strain of 2 to 6% in the tube longitudinal direction on a tensile side is imparted to the ear portions of the gradually changing portions.

(4) In the above-mentioned torsion beam manufacturing method (1), using a vertically movable ship-bottom-shaped upper die where upward tapered portions are contiguously formed with both ends of an upper horizontal portion, upper clamps which are arranged on both end sides of the movable upper die in a vertically movable manner, a vertically movable lower die where vertical portions are contiguously formed with both ends of a lower horizontal portion, and lower clamps which are arranged on both end sides of the lower die in a fixed manner, a portion of the tubular body is formed into an approximately U-shape in cross section or an approximately V-shape in cross section by crushing the portion of the tubular body in the radial direction by the upper die and the lower die and, at the same time, warp deformation is applied to the tubular body in the direction that a tube center portion projects downward by three points bending by the upper die and the lower clamps and, thereafter, both tube end portions are clamped by the upper clamps and the lower clamps and, at the same time, the upper and lower dies are elevated with respect to the lower clamps while maintaining the tube center portion in a clamped state thus applying bending to the tubular body with the bottom line set as the inner side of bending and, due to the bending, a bending strain of 2 to 6% in the tube longitudinal direction on a tensile side is imparted to ear portions of gradually changing portions.

(5) In the above-mentioned torsion beam manufacturing method (1), using a vertically movable ship-bottom-shaped upper die where upward tapered portions are contiguously formed with both ends of an upper horizontal portion, upper clamps which are arranged on both end sides of the upper die in a vertically movable manner, a fixed lower die where vertical portions are contiguously formed with both ends of a lower horizontal portion, and warp accelerating rotary dies which are arranged on both end sides of the lower die, a portion of the tubular body is formed into an approximately U-shape in cross section or an approximately V-shape in cross section by crushing the portion of the tubular body in the radial direction by the upper die and the lower die and, at the same time, warp deformation is applied to the tubular body in the direction that a tube center portion projects downward by three points bending by the upper die and the warp accelerating rotary dies in an upwardly rotating state and, thereafter, both tube end portions are clamped and bent by the upper clamps and the warp accelerating rotary dies in a downwardly rotating state with the bottom line set as the inner side of bending and, due to the bending, a bending strain of 2 to 6% in the tube longitudinal direction on a tensile side is imparted to ear portions of gradually changing portions.

(6) In the above-mentioned torsion beam manufacturing method (1) or (2), using the vertically movable ship-bottom-shaped upper die where the upward tapered portions are contiguously formed with both ends of the upper horizontal portion, the upper clamps which are arranged on both end sides of the upper die in a vertically movable manner, the fixed lower die where the downward tapered portions are contiguously formed with both ends of the lower horizontal portion, and warp accelerating advancing/retracting dies having a tapered shape which are arranged on both end sides of the lower die, a portion of the tubular body is formed into an approximately U-shape in cross section or an approximately V-shape in cross section by crushing the portion of the tubular body in the radial direction by the upper die and the lower die and, at the same time, warp deformation is applied to the tubular body in the direction that a tube center portion projects downward by three points bending by the upper die and the advanced warp accelerating advancing/retracting dies and, thereafter, the upper die is released and the warp accelerating advancing/retracting dies are retracted and, next, both tube end portions are clamped and bent by the upper clamps and the downward tapered portions while clamping the tube center portion by the upper and lower dies with the bottom line set as the inner side of bending and, due to the bending, a bending strain of 2 to 6% in the tube longitudinal direction on a tensile side is imparted to the ear portions of the gradually changing portions.

(7) In the above-mentioned torsion beam manufacturing method (1) or (2), using the vertically movable ship-bottom-shaped upper die where the upward tapered portions are contiguously formed with both ends of the upper horizontal portion, upper clamps which are arranged on both end sides of the upper die in an interlocking manner with the upper die and in an advanceable and retractable manner to and from the upper die, and the fixed lower die where the downward tapered portions are contiguously formed with both ends of the upper horizontal portion, in a state where the upper clamps are retracted, a portion of the tubular body is crushed in the radial direction by the upper die and the lower die thus applying warp deformation to the tubular body in the direction that a tube center portion projects downward while forming the portion of the tubular body into an approximately U-shape in cross section or an approximately V-shape in cross section and, thereafter, the upper die is elevated and the upper clamps are advanced and, next, the upper die is lowered so that both tube end portions are clamped and bent by the upper clamps and the downward tapered portions while clamping the tube center portion by the upper and lower dies with the bottom line set as the inner side of bending and, due to the bending, a bending strain of 2 to 6% in the tube longitudinal direction on a tensile side is imparted to the ear portions of the gradually changing portions.

(8) In any one of the above-mentioned torsion beam manufacturing method (1) to (7), at least in a final stage of forming, that is, in a stage ranging from holding a state where bending is applied to the tubular body with the bottom line set as the inner side of bending to the removal of a load, a fluid pressure is applied to the inside of the tubular body.

(9) In the above-mentioned torsion beam manufacturing method (1), in a step where, in manufacturing a torsion beam having a straight part shape by forming a tubular body, using a vertically movable ship-bottom-shaped upper die where upward tapered portions are contiguously formed with both ends of an upper horizontal portion, upper clamps which are arranged on both end sides of the upper die in a vertically movable manner, and a fixed lower die where a lower horizontal portion has a length of a range equal to or larger than a length of the tubular body, in a state where the upper clamps are elevated, a portion of the tubular body is crushed in the radial direction by the upper die and the lower die thus applying warp deformation to the tubular body in the direction that a tube center portion projects downward while forming the portion of the tubular body into an approximately U-shape in cross section or an approximately V-shape in cross section and, thereafter, both tube end portions are clamped and bent by the upper clamps and the lower die with the bottom line set as the inner side of bending and, due to the bending, a bending strain of 2 to 6% in the tube longitudinal direction on a tensile side is imparted to ear portions of gradually changing portions, at least in a final stage of forming, that is, in a stage ranging from holding a state where bending is applied to the tubular body with the bottom line set as the inner side of bending to the removal of a load, a fluid pressure is applied to the inside of the tubular body.

(10) A torsion beam manufactured from a raw tube using any one of the above-mentioned manufacturing methods (1) to (9) being characterized in that, a residual stress σ which is defined by a maximum value of a maximum principal stress within an ear lobule shape forming range in the ear portion of the gradually changing portion of the torsion beam is suppressed to 50% or less with respect to a yield stress YS of the raw tube.

With respect to the residual stress distribution in the wall thickness direction in the ear portion which occurs mainly when the tubular body receives folding in the circumferential direction at the time of forming the torsion beam, by carrying out the bending with the bottom line set as a belly side (also referred to as an "inner side of bending") in a next stage, a strain on a tensile side acts in the longitudinal direction on both inner and outer surfaces of an ear portion. Hence, the residual stress distribution changes whereby the residual tensile stress in the inner surface can be reduced.

A residual tensile stress of the ear portion of the torsion beam can be reduced, and also work hardening can be applied to the ear portion so that a fatigue strength of the ear portion can be enhanced. With respect to steps, a step in which slight bending of 2 to 6% is applied is only added after the usual crushing step. That is, the restriction on a length of a manufactured tube is equal to the corresponding restriction in a usual manufacturing method, and it is unnecessary to add steps such as grinding, applying torsion and heat treatment. Hence, disadvantages of the manufacturing method in terms of productivity and cost are extremely small to be ignored.

BRIEF DESCRIPTION OF THE DRAWINGS

FIG. 5 is a schematic side view showing one example of a torsion beam.

FIG. 7 is an explanatory view showing a state where a a bending strain on a tensile side is applied to a gradually changing portion of the ear portion.

FIG. 8 is a schematic view showing one example of preshaping (first step).

FIG. 11 is a schematic view showing one example of a torsion beam.

FIG. 12 is a schematic view showing one example of a torsion beam.

DESCRIPTION OF REFERENCE NUMERALS AND SIGNS

Figure 1:
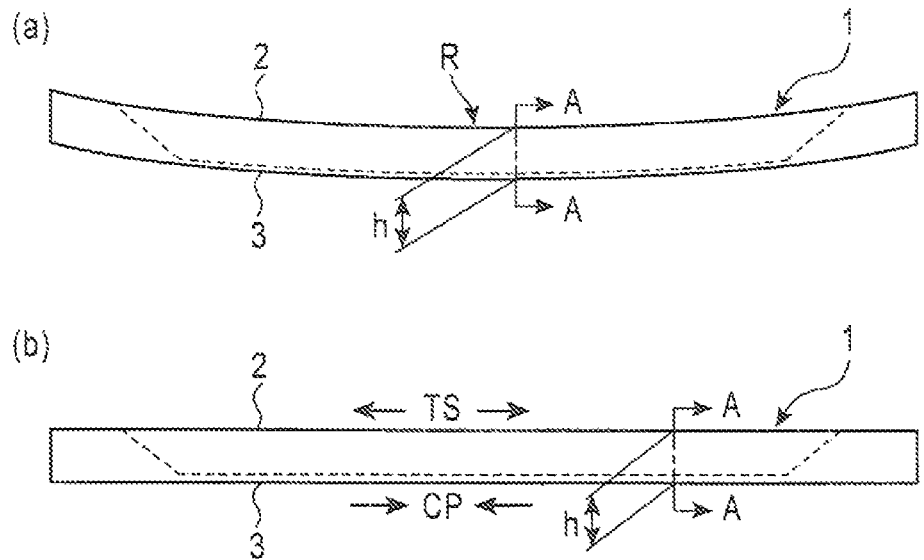
FIG. 1 is a schematic side view showing one example of a case where a torsion beam having a straight part shape is manufactured.

1: tubular body, 2: ear portion, 3: bottom line
4: upper die (vertically movable)
4A: upper die elevating/lowering drive means (hydraulic cylinder or the like)
5: lower die (fixed)
6: upper clamp (vertically movable; for clamping tube end)
6A: upper clamp elevating/lowering drive means (hydraulic cylinder or the like)
7A: gradually changing portion, 7: ear portion of gradually changing portion
8: inverted-triangular-shaped prepress upper die
9: inverted-triangular-shaped prepress lower die
10: lower die (vertically movable)
11: lower clamp (fixed; for clamping tube end)
12: warp accelerating rotary die -continued 13: warp accelerating advancing/retracting die
14: upper clamp (interlockingly movable with upper die, advanceable and retractable; for clamping tube end)
14A: upper clamp advancing and retracting drive means (hydraulic cylinder or the like)
20, 60: pressure booster, 21, 61: feedwater valve, 22, 23, 62: seal cap (sealing cap) 24, 63: air release valve, 30: strain gauge
41: upper horizontal portion
42: upward tapered portion
51, 101: lower horizontal portion (lower bottom line horizontal portion)
52: downward tapered portion
53, 103: vertical portion
γ: residual stress ratio
εa: bending strain on tensile side geometrically calculated based on shape before removal of load
εb: residual plastic bending strain after removal of load
FC: high risk parts of fatigue crack initiation
BW: region where bending is performed
TS: tensile
CP: compression
R: curvature radius
h: part height of the torsion beam
RD: press, lowering
RT: rotating
FW: advancing
BW: retracting
UW: elevating

DETAILED DESCRIPTION

Figure 3:
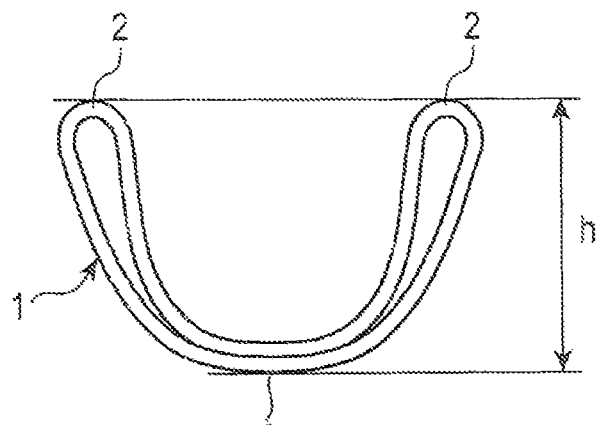
FIG. 3 is a cross-sectional view taken along a line A-A (as viewed in the direction indicated by an arrow A-A) in FIG. 1 or FIG. 2.

When a torsion beam having a straight part shape is to be manufactured, for example, as shown in FIG. 1, in a first step (FIG. 1(a)), a portion of a tubular body 1 which is a circular tube in a raw configuration is formed into an approximately U-shape in cross section (FIG. 3) by crushing the portion of the tubular body in the radial direction. In this step, bending (curvature radius R) which sets a bottom line 3 as a back side (outer side of bending) is simultaneously performed. Then, in a second step (FIG. 1(b)), bending (curvature radius R) which sets the bottom line 3 as a belly side (inner side of bending) is performed for forming a torsion beam having a straight part shape. Bending in the first step is performed such that a bending strain of 2 to 6% on a tensile TS side is imparted to an ear portion 2 by bending in the second step (unbending from the bent part shape into the straight part shape). On the other hand, a bending strain on a compression CP side is imparted to the bottom line 3. That is, the curvature radius R in the first step is set with respect to the part height h of the torsion beam such that a bending strains on a tensile TS side of the ear portion defined by Formula (1) using a part height h of the torsion beam and the curvature radius R in the first step becomes 2 to 6%:

$$\epsilon = h/(2R+h) \times 100 (\%) \quad (1).$$

Figure 2:
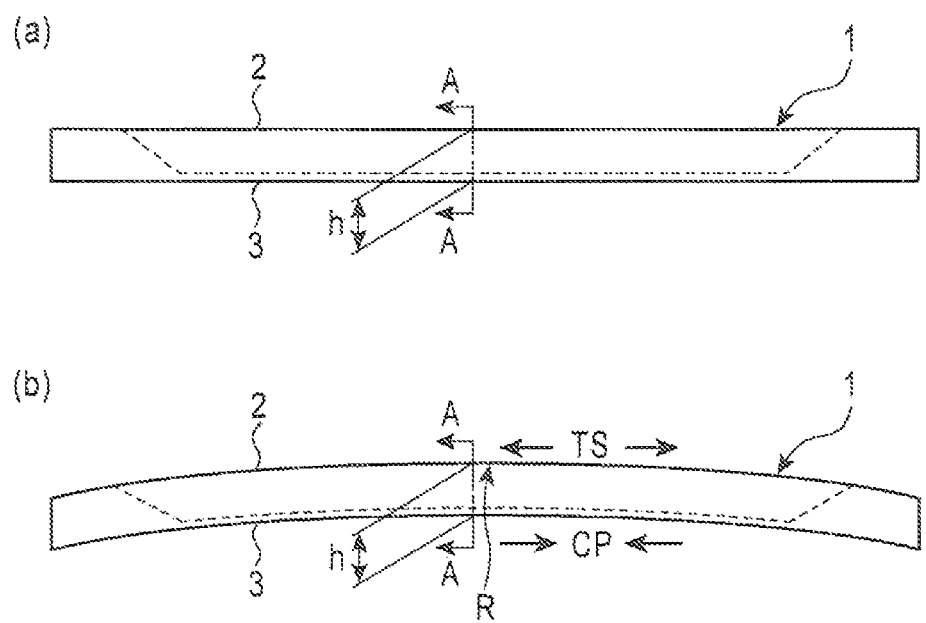
FIG. 2 is a schematic side view showing one example of a case where a torsion beam having a bent part shape is manufactured.

On the other hand, when a torsion beam having a bent part shape is to be manufactured, for example, as shown in FIG. 2, in a first step (FIG. 2(a)), a portion of a tubular body 1 which is a circular tube in a raw configuration is formed into an approximately U-shape in cross section (FIG. 3) by crushing the portion of the tubular body in the radial direction. In this step, a bottom line 3 is not bent and is held straight. Then, in a second step (FIG. 2(b)), bending which sets the bottom line 3 as a belly side (inner side of bending) is performed for forming a torsion beam having a bent part shape. Bending in the second step is performed such that a bending strain of 2 to 6% on a tensile TS side is imparted to an ear portion 2. On the other hand, a bending strain on a compression CP side is imparted to the bottom line 3. That is, the curvature radius R in the second step is set with respect to a part height h of the torsion beam such that a bending strains on a tensile TS side of the ear portion 2 defined by Formula (2) using a part height h of the torsion beam and the curvature radius R in the second step becomes 2 to 6%:

$$\epsilon = h/(2R-h) \times 100 (\%) \quad (2).$$

Figure 4:
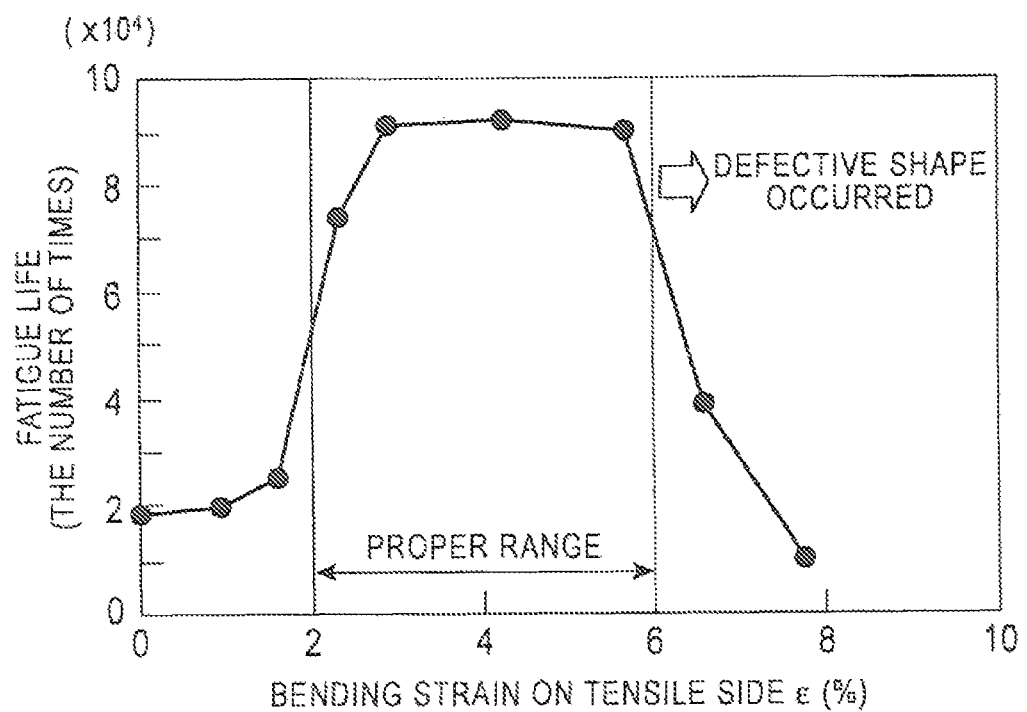
FIG. 4 is a graph showing one example of a result of the investigation of the relationship between a bending strain on a tensile side imparted to an ear portion of the torsion beam and endurance lifetime (or fatigue life) obtained by a fatigue test.

By setting the bending strain on a tensile TS side imparted to the ear portion 2 to 2 to 6%, a tensile residual stress in the ear portion 2 can be effectively reduced without causing a defective shape, and fatigue strength can be enhanced by work hardening. For example, FIG. 4 shows one example of a result of the investigation of endurance lifetime (or fatigue life) (the number of times) obtained by carrying out a following fatigue test. Forming in the first step (FIG. 1(a)) and forming in the second step (FIG. 2(b)) shown in FIG. 1 are applied to a tubular body which is a circular tube in a raw configuration and has a tensile strength of 780 MPa, an outer diameter of 101.6 mm, a wall thickness of 3.4 mm and a length of 1200 mm, wherein a level of a bending strain on a tensile TS side of the ear portion 2 is changed thus manufacturing a torsion beam having a straight part shape. Then, the fatigue test which imitates a repeated stress loaded state which the torsion beam mounted on a compact car is estimated to receive is performed with respect to the manufactured torsion beam. It is understood from FIG. 4 that the endurance lifetime is largely enhanced when the bending strain is within a range of 2 to 6%. To the contrary, when the bending strain is less than 2%, the endurance lifetime enhancing effect is insufficient, while when the bending strain exceeds 6%, a defective shape occurs. Hence, endurance lifetime is largely lowered whereby the torsion beam cannot be manufactured.

Further, with respect to a region BW where bending in the second step is performed, for example, depending on a case, the bending may be applied only to high risk parts FC of the fatigue crack initiation (for example, boundary portions between crushed portions and non-crushed portions, hereinafter referred to as "gradually changing portions" 7A) shown in FIG. 5(a), FIG. 5(b) without applying the bending over the whole tube longitudinal direction.

The region BW where the bending in the second step is performed is not only limited to the high risk parts FC of the fatigue crack initiation, and bending may be applied to other parts when necessary. The highest risk part FC among the high risk parts of the fatigue crack initiation is the ear portion 7 of the gradually changing part 7A. Hence, it is preferable to perform forming such that the bending strain of 2 to 6% in the longitudinal direction on a tensile TS side is imparted at least to the ear portion 7 of the gradually changing part 7A eventually.

To impart the bending strain of 2 to 6% on a tensile TS side to the ear portion 7 of the gradually changing part 7A eventually, we provide a torsion beam manufacturing method which specifically forms a torsion beam using dies. It is thus possible to reduce a residual stress in a fatigue high risk part without applying a fluid pressure to the inside of the tubular body during forming from the raw tube to the torsion beam.

Further, a fluid pressure may be applied to the inside of a tubular body during forming. Due to such an operation, we can provide a torsion beam product which exhibits high dimensional accuracy (with small warp or torsion in the longitudinal direction or with small distortion of surface) in addition to the reduction of a residual stress.

We provide a forming method which is suitable for forming a torsion beam having a straight part shape and uses both bending and the application of a fluid pressure loading.

We provide a torsion beam which exhibits excellent torsional fatigue characteristics by restricting a residual stress in the ear portion 7 of the gradually changing part 7A in a product manufactured by our manufacturing methods.

Figure 6:
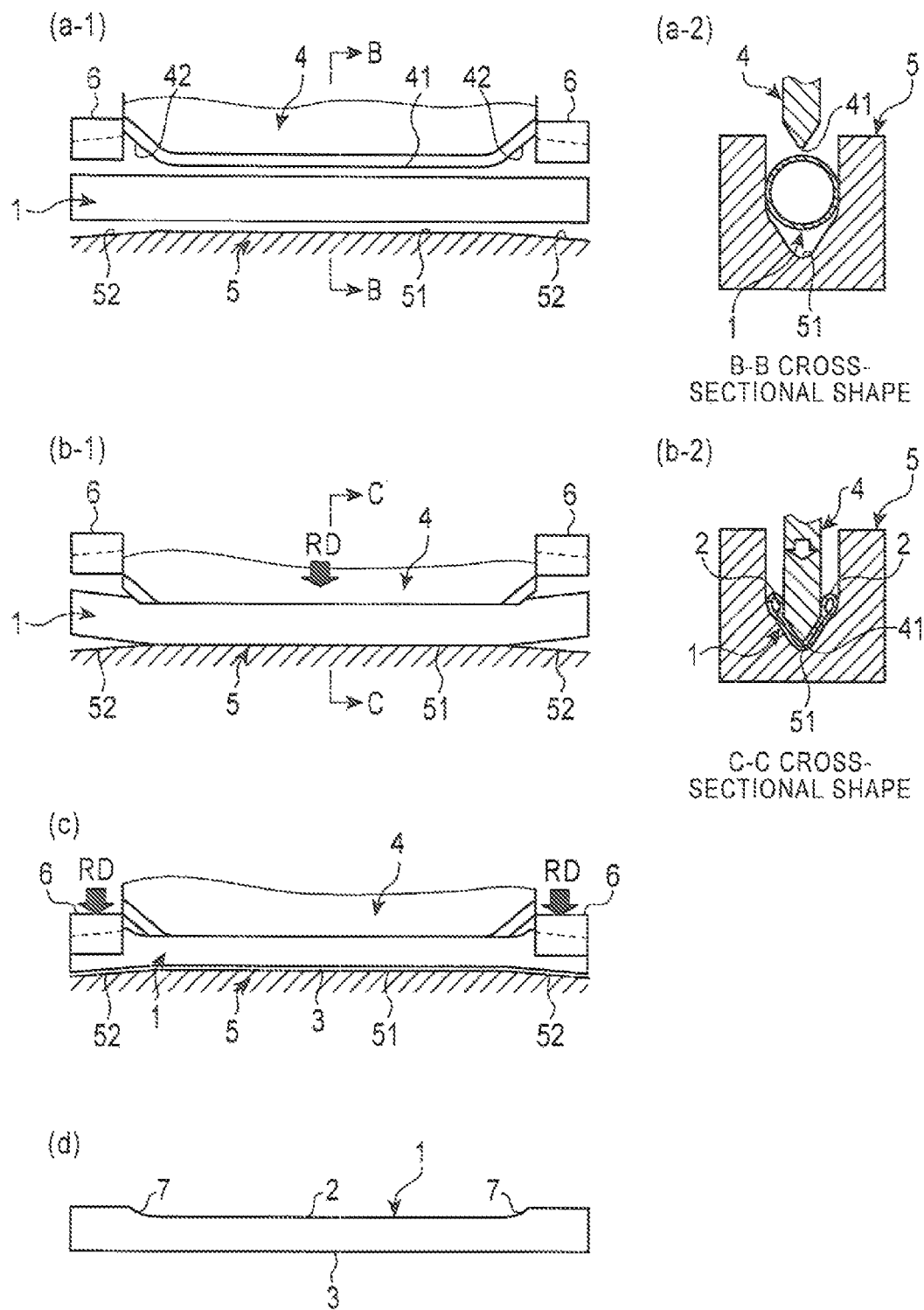
FIG. 6 is a schematic view showing another example of a torsion beam.

In manufacturing a torsion beam by forming a tubular body, for example, as shown in FIG. 6(a-1) and FIG. 6(a-2) (tube set), a vertically movable ship-bottom-shaped upper die 4 where upward tapered portions 42 are contiguously formed with both ends of an upper horizontal portion 41, upper clamps 6 which are arranged on both end sides of the upper die 4 in a vertically movable manner, and a fixed lower die 5 where downward tapered portions 52 are contiguously formed with both ends of the lower horizontal portion 51 are used. As shown in FIG. 6(b-1) and FIG. 6(b-2) (crushing by the upper die), a portion of the tubular body 1 is formed into an approximately V-shape in cross section (or an approximately U-shape in cross section also) by crushing the portion of the tubular body 1 in the radial direction by the upper die 4 and the lower die 5 and, thereafter, as shown in FIG. 6(c) (crushing both tube ends), both tube end portions are clamped and bent by the upper clamps 6 and the downward tapered portions 52 of the lower die 5 with the bottom line 3 set as the inner side of bending. Due to such bending (also referred to as bending straightening, the same definition being applicable hereinafter)), a bending strain of 2 to 6% in the tube longitudinal direction on a tensile TS side is imparted to the ear portions 7 of the gradually changing portions 7A shown in FIG. 7.

FIG. 7 is an explanatory view showing a state where the bending strain on the tensile TS side is imparted to the ear portions 7 of the gradually changing portions 7A, wherein the stage of crushing by the upper die shown in FIG. 6(b-1) and FIG. 6(b-2) corresponds to FIG. 7(a), and the stage of taking out the tubular body shown in FIG. 6(d) after the stage of crushing both tube ends shown in FIG. 6(c)(after a springback) corresponds to FIG. 7(b). The ear portions 7 of the gradually changing portions 7A are in an upwardly warped and bent state in FIG. 7(a) and in a substantially flat state in FIG. 7(b). Hence, eventually, a bending strain on a tensile side is imparted due to bending with the bottom line 3 set as the inner side of bending.

The residual stress distribution in the wall thickness direction in the ear portion 7 of the gradually changing portion 7 which occurs in an initial forming stage of the forming of the tubular body into an approximately V-shape in cross section (V-shaped press; FIG. 6(b-1) and FIG. 6(b-2)) (ear portion forming stage) occurs mainly when the tubular body receives folding in the circumferential direction. However, by carrying out the bending with the bottom line 3 set as the inner side of bending in a final stage of forming (FIG. 6(c)), strain on a tensile TS side acts in the longitudinal direction on both inner and outer surfaces of the ear portion 7 of the gradually changing portion 7A. Hence, the residual stress distribution changes whereby the residual tensile stress in the inner surface of the ear portion 7 of the gradually changing portion 7A can be reduced.

In manufacturing a torsion beam by forming a tubular body, for example, as shown in FIG. 8, as a first step, a tube longitudinal center portion of a tubular body 1 is preliminarily formed into an approximately inverted-triangular-shape in cross section (inverted-triangular-shaped prepress), and preshaping which applies warp deformation to tube ends in the direction that a V-shaped bottom center portion projects downward is performed. In the first step, although an inverted-triangular-shaped prepress upper die 8 and an inverted-triangular-shaped prepress lower die 9 shown in FIG. 8(a) are used, by setting a V-bottom portion of the inverted-triangular-shaped prepress lower die 9 at the longitudinal center lower than semicircular bottom portions of the inverted-triangular-shaped prepress lower die 9 at both longitudinal ends by a gap δ(>0) after forming (FIG. 8(c), (d)), the inverted-triangular-shaped prepressing and the forming of the warp deformation can be completed with one press operation. The bottom portion having the approximately inverted-triangular-shape in cross section may have an approximately U shape in place of the approximately V shape in this example.

Figure 9:
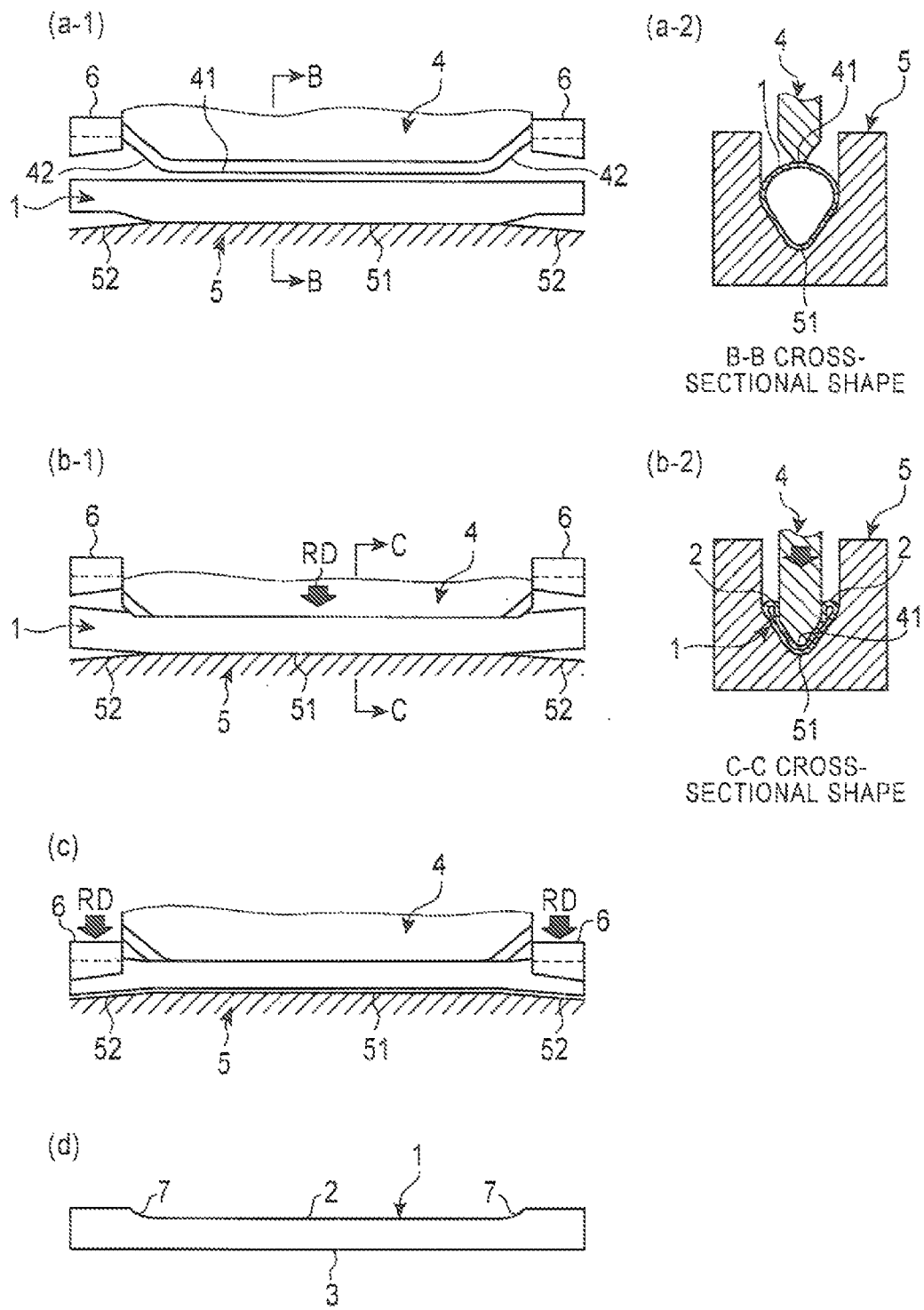
FIG. 9 is a schematic view showing one example of forming (second step) after preshaping (first step).

Next, for example, as shown in FIG. 9, as a second step, a vertically movable ship-bottom-shaped upper die 4 where upward tapered portions 42 are contiguously formed with both ends of an upper horizontal portion 41, upper clamps 6 which are arranged on both end sides of the upper die 4 in a vertically movable manner, and a fixed lower die 5 where downward tapered portions 52 are contiguously formed with both ends of the lower horizontal portion 51 are used (FIG. 9(a-1) and FIG. 9(a-2)(tube set)). A portion of the tubular body 1 is formed into an approximately V-shape in cross section (or an approximately U-shape in cross section) by crushing the portion of the tubular body 1 in the radial direction by the upper die 4 and the lower die 5 (FIG. 9(b-1) and FIG. 9(b-2) (crushing by upper die)) and, thereafter, both tube end portions are clamped and bent by the upper clamps 6 and the downward tapered portions 52 of the lower die 5 with the bottom line 3 set as the inner side of bending (FIG. 9(c) (crushing both tube ends)). Due to such bending (bending straightening), a bending strain of 2 to 6% in the tube longitudinal direction on a tensile TS side is imparted to the ear portions 7 of the gradually changing portions 7A shown in FIG. 7.

The stage of crushing by the upper die shown in FIG. 9(b-1) and FIG. 9(b-2) correspond to FIG. 7(a), and the stage of taking out the tubular body in FIG. 9(d) after the stage of crushing both tube ends shown in FIG. 9(c)(after a springback) corresponds to FIG. 7(b). The ear portions 7 of the gradually changing portions 7A are in an upwardly warped and bent state in FIG. 7(a) and in a substantially flat state in FIG. 7(b). Hence, eventually, a bending strain on a tensile side is imparted due to bending with the bottom line 3 set as the inner side of bending.

The residual stress distribution in the wall thickness direction in the ear portion 7 of the gradually changing portion 7A which occurs in an initial forming stage of the forming of the tubular body into an approximately V-shape in cross section (V-shaped press; FIG. 9(b-1) and FIG. 9(b-2)) (ear portion forming stage) occurs mainly when the tubular body receives folding in the circumferential direction. However, by carrying out the bending with the bottom line 3 set as the inner side of bending in a final stage of forming (FIG. 9(c)), strain on a tensile side acts in the longitudinal direction on both inner and outer surfaces of the ear portion 7 of the gradually changing portion 7A. Hence, the residual stress distribution changes whereby the residual tensile stress in the inner surface of the ear portion 7 of the gradually changing portion 7A can be reduced. We use two pressing steps. Accordingly, although the number of dies to be used in manufacturing the same torsion beam (total forming amount being the same) is increased compared to a case where one press step is used, a press load in each step can be lowered.

Figure 10:
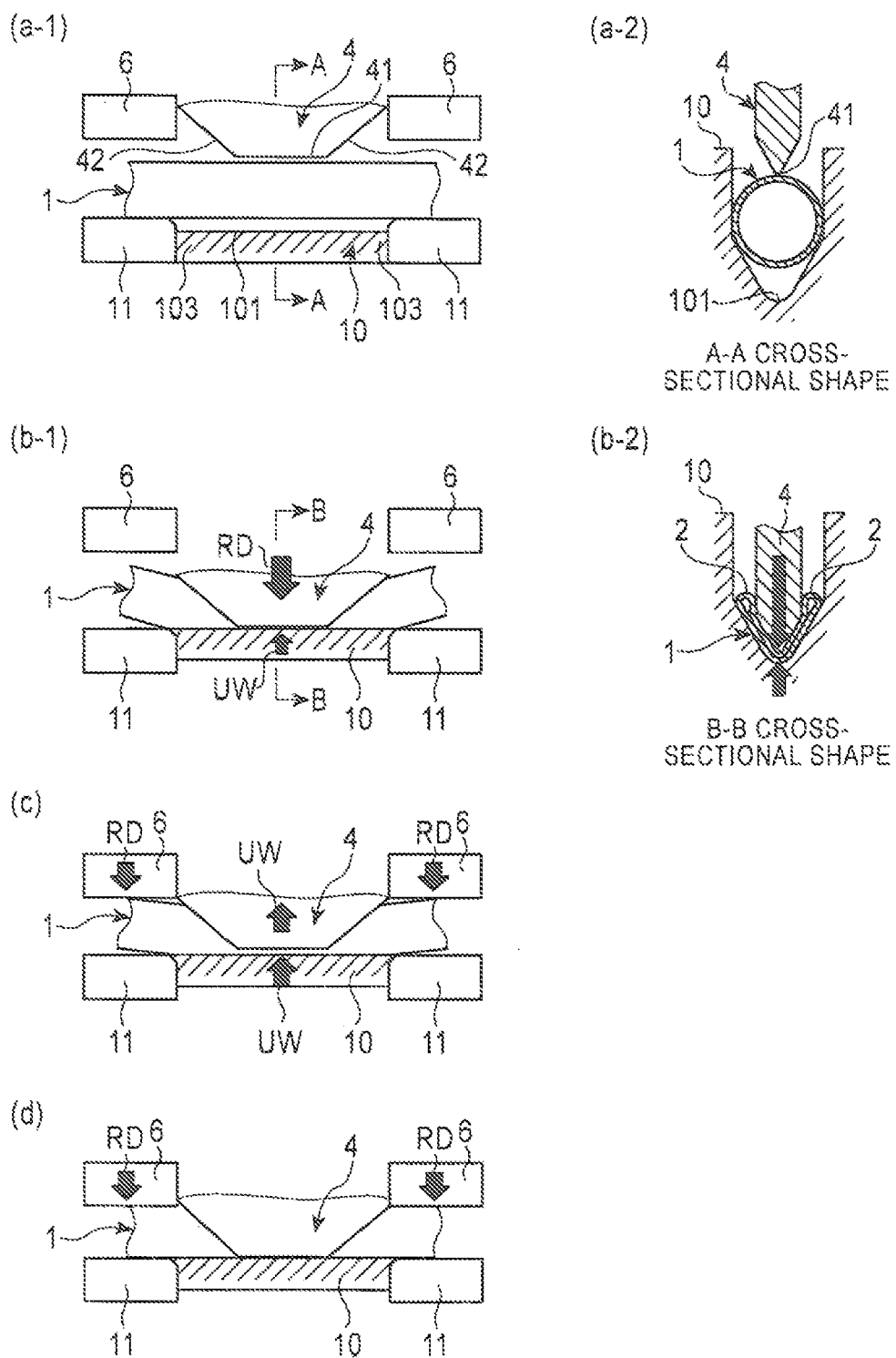
FIG. 10 is a schematic view showing one example of a torsion beam.

In manufacturing a torsion beam by forming a tubular body, for example, as shown in FIG. 10, a vertically movable ship-bottom-shaped upper die 4 where upward tapered portions 42 are contiguously formed with both ends of an upper horizontal portion 41, upper clamps 6 which are arranged on both end sides of the upper die 4 in a vertically movable manner, a vertically movable lower die 10 where vertical portions 103 are contiguously formed with both ends of a lower horizontal portion 101, and lower clamps 11 which are arranged on both end sides of the lower die 10 in a fixed manner are used (FIG. 10(*a*-1) and FIG. 10(*a*-2)(tube set). A portion of the tubular body 1 is formed into an approximately V-shape in cross section (or an approximately U-shape in cross section also) by crushing the portion of the tubular body 1 in the radial direction by the upper die 4 and the lower die 10 and, at the same time, warp deformation is applied to the tubular body 1 in the direction that the tube center portion projects downward by three points bending by the upper die 4 and the lower clamps 11 ((FIG. 10(*b*-1) and FIG. 10(*b*-2)(V-press forming(lower the upper die and elevate the lower die). Thereafter, both tube end portions are clamped by the upper clamps 6 and the lower clamps 11 and, at the same time, the upper and lower dies 4, 10 are elevated with respect to the lower clamps 11 while maintaining a tube center portion clamping state thus applying bending to the tubular body 1 with the bottom line 3 set as the inner side of bending ((FIG. 10(*c*) (elevating the upper and lower dies, and lowering the tube end clamps)). Due to such bending (bending straightening), a bending strain of 2 to 6% in the tube longitudinal direction on a tensile TS side is imparted to the ear portions 7 of the gradually changing portions 7A shown in FIG. 7.

The V-shaped press forming stage shown in FIG. 10(*b*-1) and FIG. 10(*b*-2) corresponds to FIG. 7(*a*), and the stage of taking out the tubular body after the stage shown in FIG. 10(*c*), (*d*) is finished (after a springback) corresponds to FIG. 7(*b*). The ear portions 7 of the gradually changing portions 7A are in an upwardly warped and bent state in FIG. 7(*a*) and in a substantially flat state in FIG. 7(*b*). Hence, eventually, a bending strain on a tensile TS side is imparted due to bending with the bottom line 3 set as the inner side of bending.

The residual stress distribution in the wall thickness direction in the ear portion 7 of the gradually changing portion 7A which occurs in an initial forming stage (ear portion forming stage) of V-shaped press forming (FIG. 10(*b*-1) and FIG. 10(*b*-2)) occurs mainly when the tubular body receives folding in the circumferential direction. However, by carrying out the bending with the bottom line 3 set as the inner side of bending in a final stage of forming (FIG. 10(*c*), (*d*)), strain on a tensile TS side acts in the longitudinal direction on both inner and outer surfaces of the ear portion 7 of the gradually changing portion 7A. Hence, the residual stress distribution changes whereby the residual tensile stress in the inner surface of the ear portion 7 of the gradually changing portion 7A can be reduced. A bending amount of the tubular body 1 in the tube longitudinal direction can be adjusted by lowering and elevation of the lower die 10. Hence, compared to a case where the fixed lower die 5 is used, a control range of an amount of bending strain on a tensile side imparted to the ear portion 7 of the gradually changing portion 7A can be broadened.

In manufacturing a torsion beam by forming a tubular body, for example, as shown in FIG. 11, a vertically movable ship-bottom-shaped upper die 4 where upward tapered portions 42 are contiguously formed with both ends of an upper horizontal portion 41, upper clamps 6 which are arranged on both end sides of the upper die 4 in a vertically movable manner (interlockingly movable with the upper die 4 and vertically movable independently from the upper die 4), a fixed lower die 5 where vertical portions 53 are contiguously formed with both ends of the lower horizontal portion 51, and warp accelerating rotary dies 12 which are arranged on both end sides of the lower die 5 are used. A tubular body 1 is set (FIG. 11(*a*) (tube set)). A portion of the tubular body 1 is formed into an approximately V-shape in cross section or an approximately U-shape in cross section by crushing the portion of the tubular body 1 in the radial direction by the upper and lower dies 4, 5 and, at the same time, warp deformation is applied to the tubular body in the direction that the tube center portion projects downward by three points bending by the upper die 4 and the warp accelerating rotary dies 12 in an upwardly rotating state (FIG. 11(*b*) (crushing by upper die+rotation of warp accelerating dies). Thereafter, both tube end portions are clamped and bent by the upper clamps 6 and the warp accelerating rotary dies 12 in a downwardly rotating state with the bottom line 3 set as the inner side of bending. Due to such bending (bending straightening), a bending strain of 2 to 6% in the tube longitudinal direction on a tensile TS side is imparted to the ear portions 7 of the gradually changing portions 7A (FIG. 11(*c*) (both tube end crushing+rotation of warp accelerating dies)). In this example, the tubular body 1 can have a straight part shape after the removal of a load and the springback (FIG. 11(*d*) (tubular body taken out after releasing clamping of upper die and both tube ends)). In FIG. 11(*a*), 4A indicates an upper die elevating/lowering drive means (hydraulic cylinder or the like), and 6A indicates an upper clamp elevating/lowering drive means (hydraulic cylinder or the like) (same means shown in drawings explained hereinafter). An upward warp amount of the tubular body 1 can be easily controlled by adjusting a rotational angle of the warp accelerating rotary dies. Hence, stable inline bending straightening can be realized irrespective of a tube size or a tube material. The inline bending straightening means forming including straightening by bending in a torsion beam forming step. The inline bending straightening method is advantageous because a post treatment step using other facility becomes unnecessary after forming a torsion beam leading to the reduction of manufacturing cost.

In manufacturing a torsion beam by forming a tubular body, for example, as shown in FIG. 12(*a*), a vertically movable ship-bottom-shaped upper die 4 where upward tapered portions 42 are contiguously formed with both ends of an upper horizontal portion 41, upper clamps 6 which are arranged on both end sides of the upper die 4 in a vertically movable manner (inter-lockingly movable with the upper die 4 and vertically movable independently from the upper die 4), a fixed lower die 5 where downward tapered portions 52 are contiguously formed with both ends of the lower horizontal portion 51, and warp accelerating advancing/retracting dies 13 having a tapered shape which are arranged on both end sides of the lower mold 5 are used.

Figure 13:
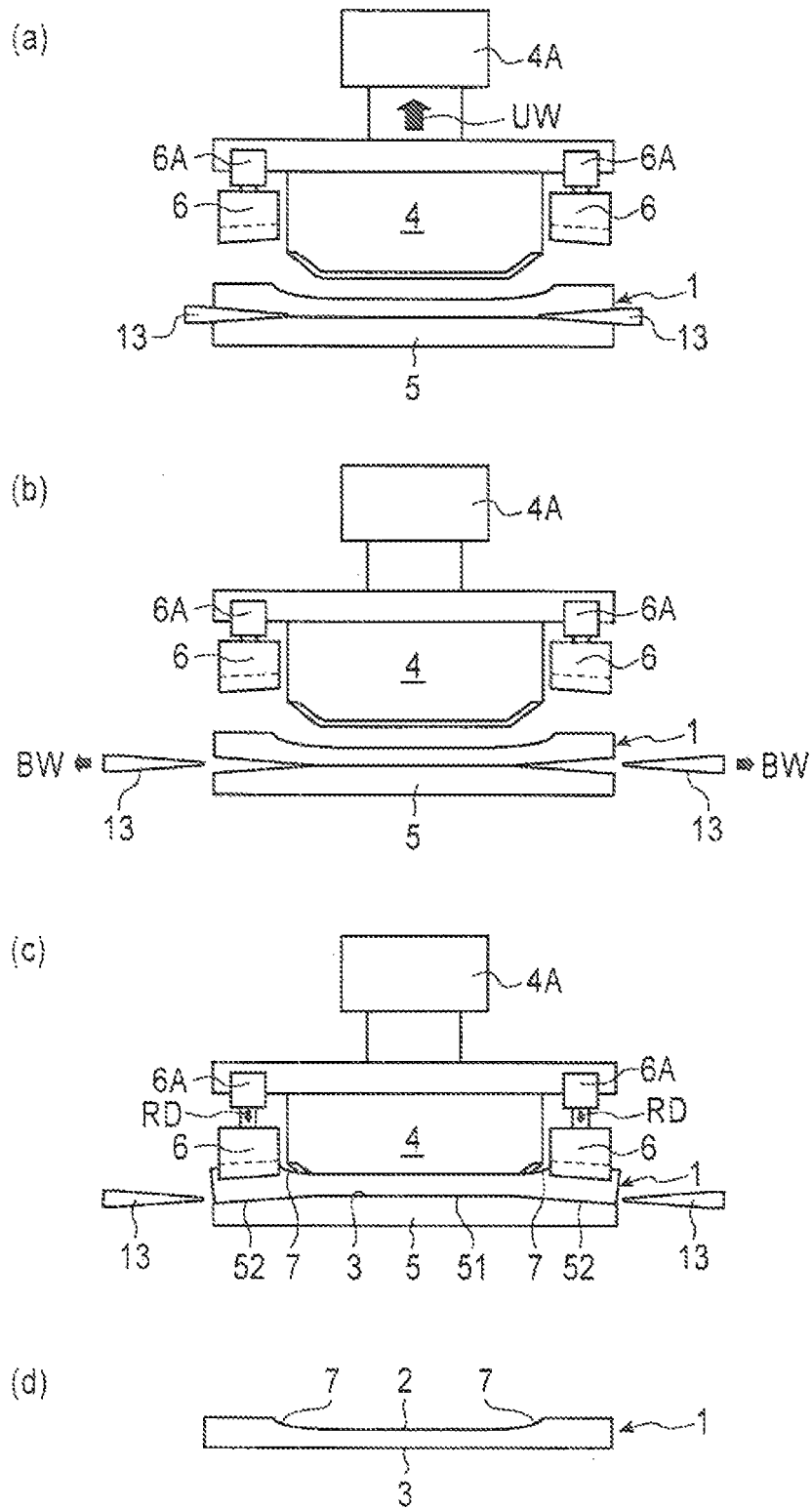
FIG. 13 is a schematic view showing one example of a torsion beam (continued from FIG. 12).

Then, as shown in FIG. 12(*a*)(advancing warp accelerating dies), first, the warp accelerating advancing/retracting dies 13 are advanced to a position where the warp accelerating advancing/retracting dies 13 overlap with the downward tapered portions 52, and the tubular body 1 is set (FIG. 12(*b*) (tube set). Subsequently, a portion of the tubular body 1 is formed into an approximately U-shape in cross section or an approximately V-shape in cross section by crushing the portion of the tubular body 1 in the radial direction by the upper die 4 and the lower die 5 and, at the same time, warp deformation is applied to the tubular body 1 in the direction that the tube center portion projects downward by three points bending by the upper die 4 and the advanced warp accelerating advancing/retracting dies 13 (FIG. 12(*c*) (crushing by upper die). Thereafter, the upper die 4 is released (FIG. 13(*a*)) and the warp accelerating advancing/retracting dies 13 are retracted (FIG. 13(*b*)). Next, both tube end portions are clamped and bent by the upper clamps 6 and the downward tapered portion 52 while clamping the tube center portion by the upper and lower dies 4, 5 with the bottom line 3 set as the inner side of bending. Due to such bending (bending straightening), a bending strain of 2 to 6% in the tube longitudinal direction on a tensile TS side is imparted to the ear portions 7 of the gradually changing portions 7A (FIG. 13(c) (crushing both tube ends). In this example, the tubular body 1 can have a straight part shape after the removal of a load and the springback (FIG. 13(d) (tubular body taken out after releasing upper die and clamping of both tube ends)). An upward warp amount of the tubular body 1 can be easily controlled by adjusting a taper angle of the warp accelerating advancing/retracting dies 13. Hence, stable inline bending straightening can be realized irrespective of a tube size or a tube material. The inline bending straightening method is advantageous because a post treatment step using other facility becomes unnecessary after forming a torsion beam leading to the reduction of manufacturing cost.

Figure 14:
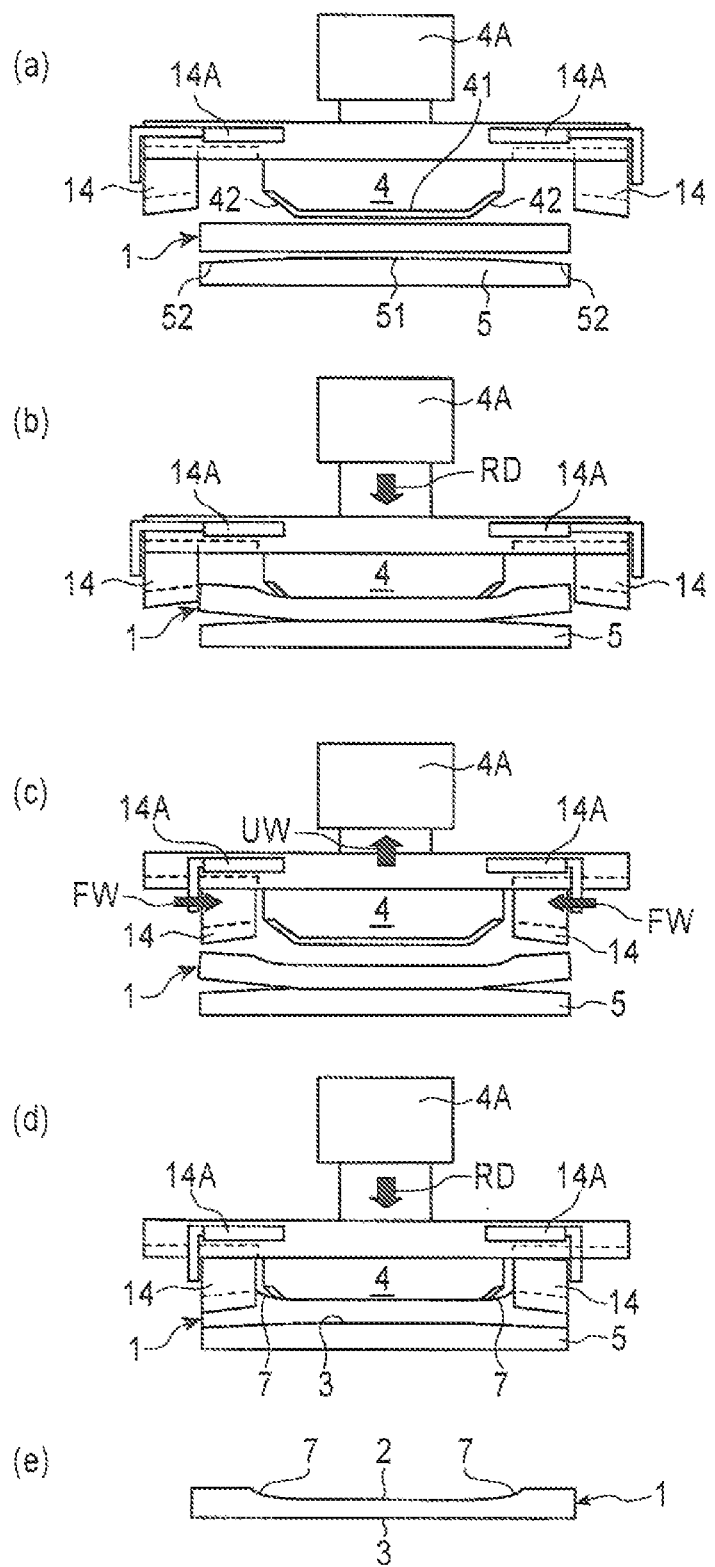
FIG. 14 is a schematic view showing one example of a torsion beam.

In manufacturing a torsion beam by forming a tubular body, for example, as shown in FIG. 14, a vertically movable ship-bottom-shaped upper die 4 where upward tapered portions 42 are contiguously formed with both ends of an upper horizontal portion 41, upper clamps 14 which are arranged on both end sides of the upper die 4 in an interlocking manner with the upper die 4 and in an advanceable and retractable manner to and from the upper die 4, and a fixed lower die 5 where downward tapered portions 52 are contiguously formed with both ends of the lower horizontal portion 51 are used. 14A indicates an upper clamp advancing and retracting drive means (hydraulic cylinder or the like).

Then, in a state where the upper clamps 14 are retracted, the tubular body 1 is set (FIG. 14(a) (tube set)). A portion of the tubular body 1 is crushed in the radial direction by the upper die 4 and the lower die 5 thus applying warp deformation to the tubular body 1 in the direction that the tube center portion projects downward while forming the portion of the tubular body 1 into an approximately U-shape in cross section or an approximately V-shape in cross section (FIG. 14(b) (crushing by the upper die). Thereafter, the upper die 4 is elevated and the upper clamps 14 are advanced (FIG. 14(c)) and, next, the upper die 4 is lowered so that both tube end portions are clamped and bent by the upper clamps 14 and the downward tapered portion 52 while clamping the tube center portion by the upper and lower dies 4, 5 with the bottom line 3 set as the inner side of bending. Due to such bending (bending straightening), a bending strain of 2 to 6% in the tube longitudinal direction on a tensile TS side is imparted to the ear portions 7 of the gradually changing portions 7A (FIG. 14(d) (second crushing (both tube ends)). In this example, the tubular body 1 can eventually have a straight part shape after the removal of a load and the springback (FIG. 14(e)). The upper clamps perform both applying a load and releasing the load in the vertical direction as the upper die elevating/lowering drive means, and does not receive a reaction force from the tube end portions at the time of elevating/lowering driving. Hence, power (capacity) of the upper clamp advancing/retracting drive means 14A can be set smaller than power of the previously-mentioned upper clamp elevating/lowering drive means 6A (receiving a reaction force from the tube end portions at the time of advancing/retracting driving) whereby the installation cost can be reduced.

In any one of the above-mentioned examples, at least in a final stage of forming, that is, in a stage ranging from holding a state where bending (bending straightening) is applied to the tubular body 1 with the bottom line set as the inner side of bending to the removal of a load, a fluid pressure is applied to the inside of the tubular body. The stage where the fluid pressure is applied to the inside of the tubular body may be performed only in the final stage of forming, and stages other than the final stage may be added to the final stage. For example, the fluid pressure may be applied to the inside of the tubular body in stages ranging from a stage before starting forming the tubular body 1 to the removal of the load after the bending straightening (in all stages of forming).

Due to such an operation, it is possible to provide a torsion beam product which exhibits high dimensional accuracy (with small warp or torsion in the longitudinal direction or with small distortion of surface) in addition to the reduction of a residual stress. Further, according to such an operation, a springback after the removal of a load can be made small. Hence, in preparing a die design, it is unnecessary to add an error caused by the springback to a target shape which a final product aims at whereby the designing of the die is simplified.

As shown in an example (see FIG. 15, FIG. 16) described later, a fluid pressure applying means which applies a fluid pressure to the inside of the tube may be constituted of a pressure booster 20, a feedwater valve 21, seal caps 22, 23, an air release valve 24 and the like.

Figure 15:
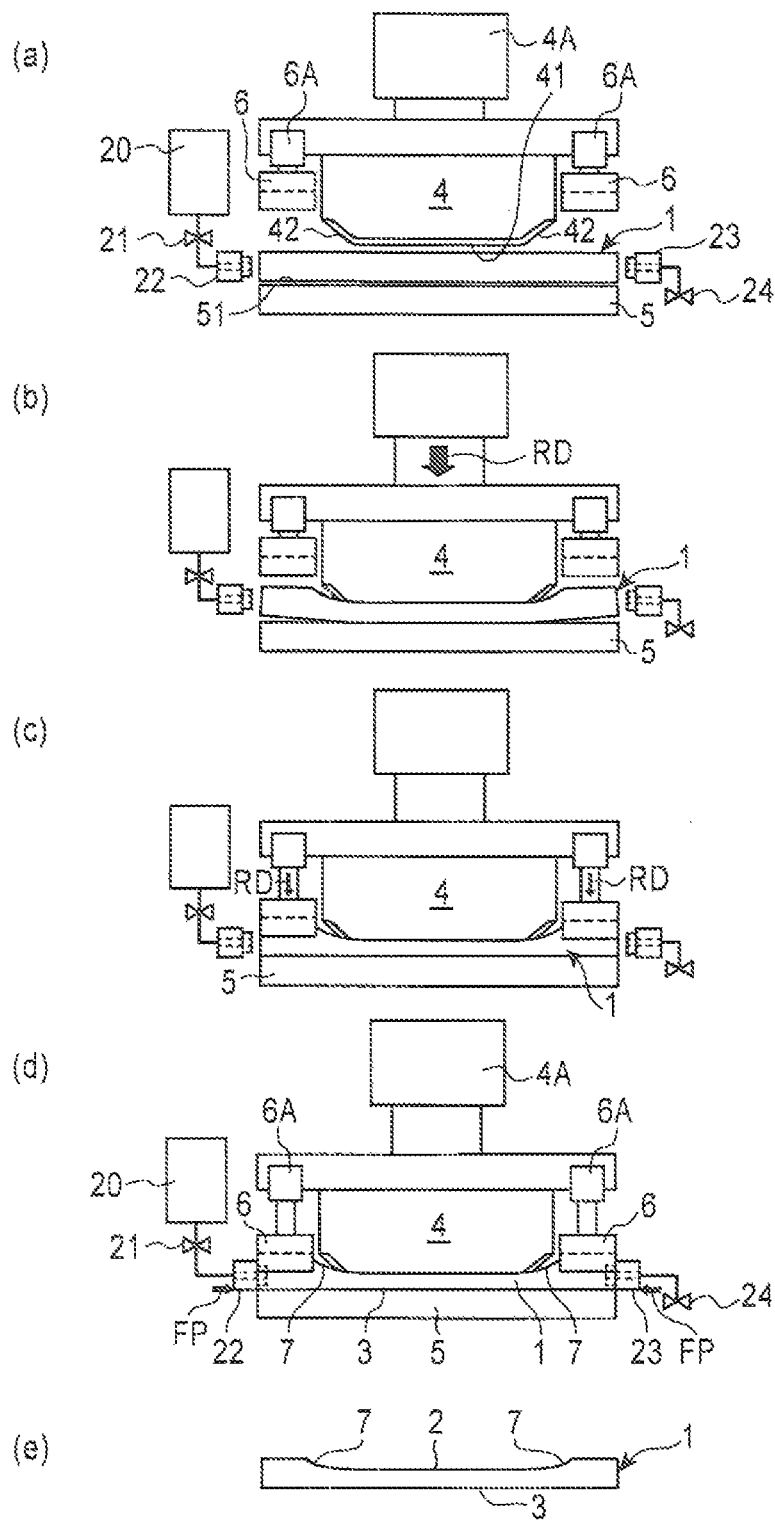
FIG. 15 is a schematic view showing one example of a torsion beam.

For example, as shown in FIG. 15, in manufacturing a torsion beam having a straight part shape by forming a tubular body 1 (FIG. 15(e)(tubular body taken out after releasing sealing and clamping by an upper die), a vertically movable ship-bottom-shaped upper die 4 where upward tapered portions 42 are contiguously formed with both ends of an upper horizontal portion 41, upper clamps 6 which are arranged on both end sides of the upper die 4 in a vertically movable manner, and a fixed lower die 5 where a lower horizontal portion 51 has a length equal to or larger than a tube length are used.

Then, a tubular body 1 is set (FIG. 15(a)) and, in a state where the upper clamps 6 are elevated, a portion of the tubular body 1 is crushed in the radial direction by the upper die 4 and the lower die 5 thus applying warp deformation to the tubular body 1 in the direction that the tube center portion projects downward (FIG. 15(b) (crushing by the upper die) while forming the portion of the tubular body 1 into an approximately U-shape in cross section or an approximately V-shape in cross section. Thereafter, both tube end portions are clamped and bent by the upper clamps 6 and the lower die 5 with the bottom line 3 set as the inner side of bending. Due to such bending (bending straightening), a bending strain of 2 to 6% in the tube longitudinal direction on a tensile TS side is imparted to the ear portions 7 of the gradually changing portions 7A (FIG. 15(c) (crushing both tube ends)). In the above-mentioned step, at least in a final stage of forming, that is, in a stage (FIG. 15(d) (an in-tube fluid-pressure load FP after sealing both tube ends)) ranging from holding a state where bending (bending straightening) is applied to the tubular body 1 with the bottom line 3 set as the inner side of bending to the removal of a load, a fluid pressure is applied to the inside of the tubular body.

A fluid pressure load FP applying means may be configured such that, for example, as shown in FIG. 15, a liquid can be fed to a seal cap 22 which constitutes one of seal caps 22, 23 by a pressure booster 20 by a feedwater valve 21, and air can be released from the seal cap 23 which constitutes the other seal cap 23 by way of an air release valve 24. In applying the fluid pressure, the seal caps 22, 23 are mounted on one tube end opening and the other tube end opening respectively and these seal caps 22, 23 are sealed and, then, a liquid (for example, water) which is pressurized by the pressure booster 20 is supplied (fluid pressure is applied) by opening the feedwater valve 21 and, at the same time, air is released by opening/closing (or setting to a proper opening) the air release valve 24 (FIG. 15(d)).

Although a case where the fluid pressure is applied to the tubular body 1 only in the final stage of forming is described in the example shown in FIG. 15, the fluid pressure may be applied to the tubular body 1 in a state where stages other than the final stage are added to the final stage.

Figure 16:
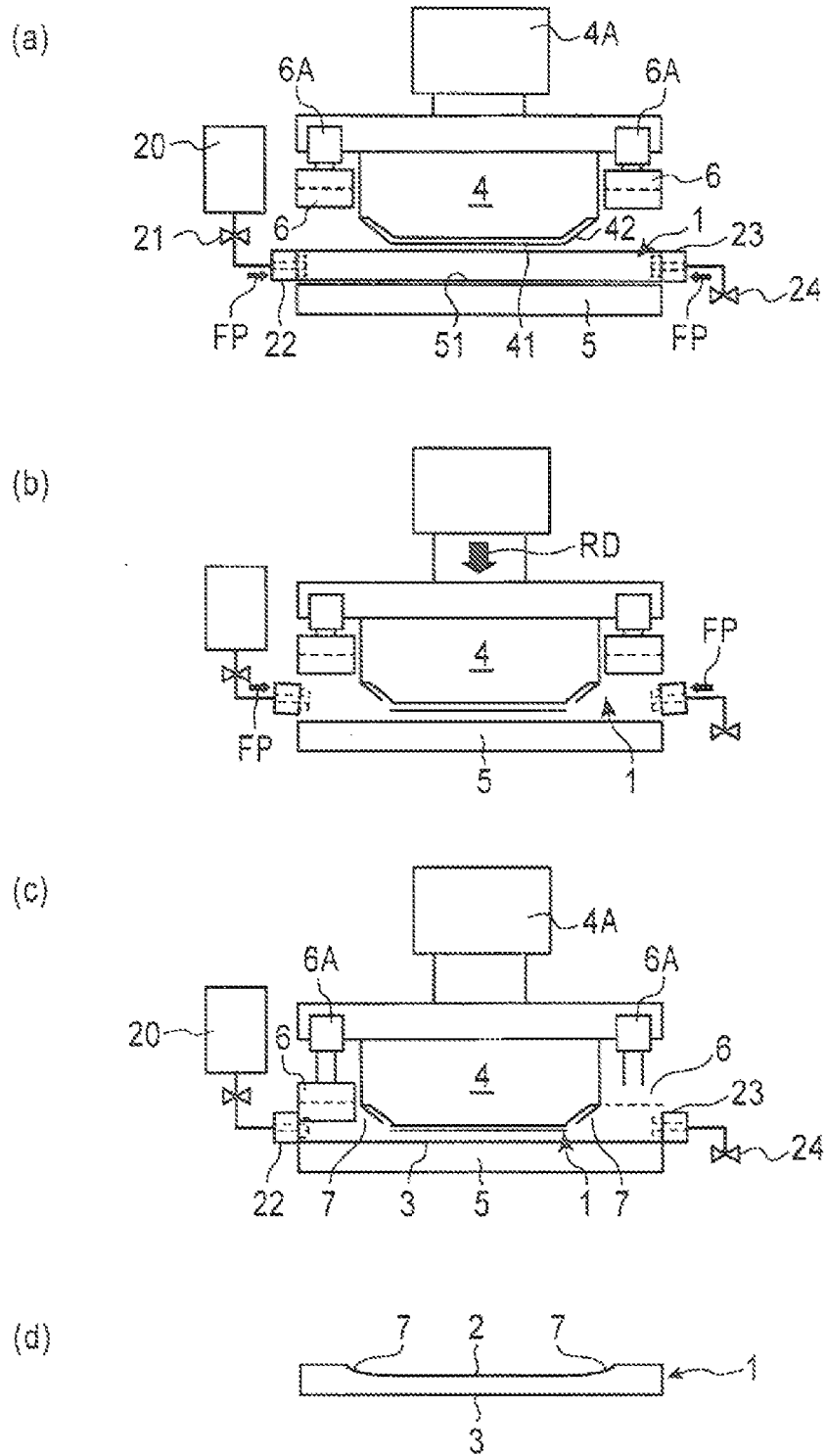
FIG. 16 is a schematic view showing another example of a torsion beam.

For example, as shown in FIG. 16, in another example, the fluid pressure may be applied to the inside of the tubular body in stages ranging from a stage before starting forming the tubular body 1 to the removal of the load after the bending straightening (in all stages of forming). Although a forming device and a fluid pressure applying means which are substantially equal to the forming device and the fluid pressure applying means shown in FIG. 15 are used in the example shown in FIG. 16, the fluid pressure applying means is mounted on the tubular body 1 before the forming is started (FIG. 16(a)(setting tube+sealing both tube ends)), forming is performed while keeping the applying of the fluid pressure to the tubular body (FIG. 16(b) (crushing the tubular body by the upper die in a state where the fluid pressure is applied to the inside of the tubular body) and FIG. 16(c) (crushing both tube ends in a state where a fluid pressure is applied to the inside of the tubular body), and the fluid pressure is applied to the inside of the tubular body until the load is released.

It is possible to provide a torsion beam product which exhibits high dimensional accuracy (with small warp or torsion in the longitudinal direction or with small distortion of surface) in addition to the reduction of the residual stress. Further, according to such an operation, a springback after the removal of a load can be made small. Hence, in preparing a die design, it is unnecessary to add an error caused by the springback to a target shape which a final product aims at whereby the designing of the die is simplified. Further, a simple-shaped lower die having a straight lower bottom line is used to form the tubular body into a straight part shape. Accordingly, in this case, a cost for manufacturing the lower die can be reduced compared to a case where a lower die having a relatively complicated shape with downward tapered portions 52 formed on both end sides of a lower horizontal portion 51 is used.

The next example is directed to a torsion beam manufactured using a raw tube by any method described above, wherein a residual stress σ which is defined by a maximum value σmax of a maximum principal stress within an ear lobule shape forming range in the ear portion of the gradually changing portion of the torsion beam is suppressed to 50% or less with respect to a yield stress YS of the raw tube.

On the other hand, in a conventional torsion beam, a residual stress σ exceeds 50% of the yield stress YS. In this manner, it is possible to provide parts where torsion fatigue is not easily caused compared to conventional parts.

The maximum value σmax of a maximum principal stress within the ear lobule shape forming range of the ear portion 7 of the gradually changing portion can be measured using a strain gauge cutout method or an X ray method. The yield stress YS of the raw tube can be obtained in accordance with a tensile test such as JIS12A or JIS11. A residual stress ratio α is defined by Formula (3) using σ and YS is set to 50% or less (γ50%):

$$\text{residual stress ratio } \gamma = \sigma/YS \times 100(\%) \quad (3).$$

Figure 18:
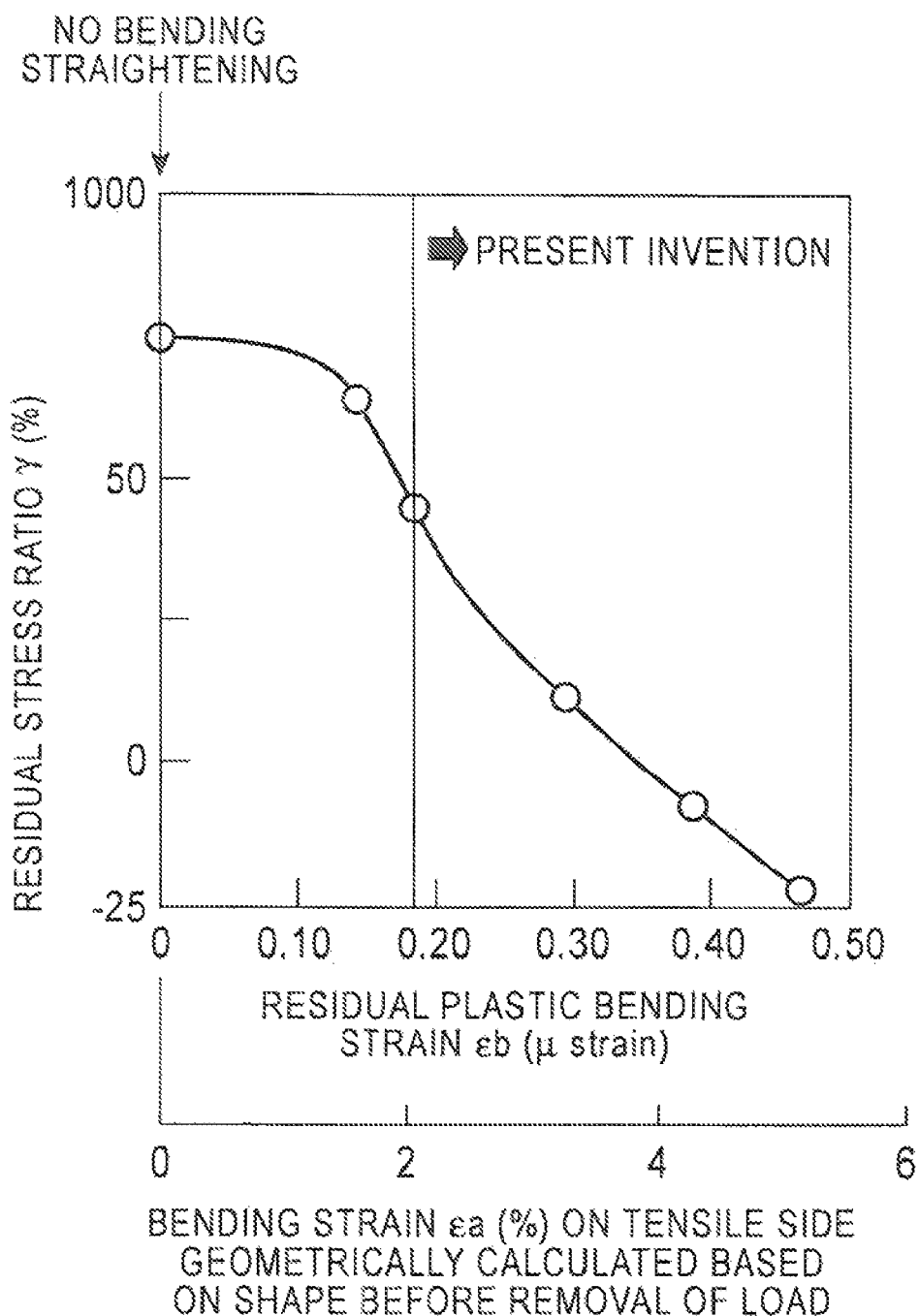
FIG. 18 is a graph showing the relationship between a residual stress ratio γ and a bending strain $\epsilon a$ on a tensile side geometrically calculated based on a shape before the removal of a load and a residual plastic bending strain $\epsilon b$ after the removal of a load.

On the other hand, as shown in FIG. 1 and FIG. 2, the bending strain ε on a tensile side imparted to the ear portion 2 (particularly, the ear portion 7 of the gradually changing portion) (indicated by εa) is geometrically calculated based on a shape before the removal of a load. When the bending strain εa is expressed in terms of a residual plastic bending strain εb after the removal of a load, although the relationship between εb and εa changes to some extent depending on a size of tubular body and a strength of a material, as shown in FIG. 18 later, by setting εa to 2% or more, εb becomes approximately 0.2% or more so that the relationship γ≦50% is obtained. A residual plastic bending strain εb on a tube outer surface of the ear portion after the removal of a load can be measured using a strain gauge method or the like, and is measured as a maximum principal strain εmax.

Figure 17:
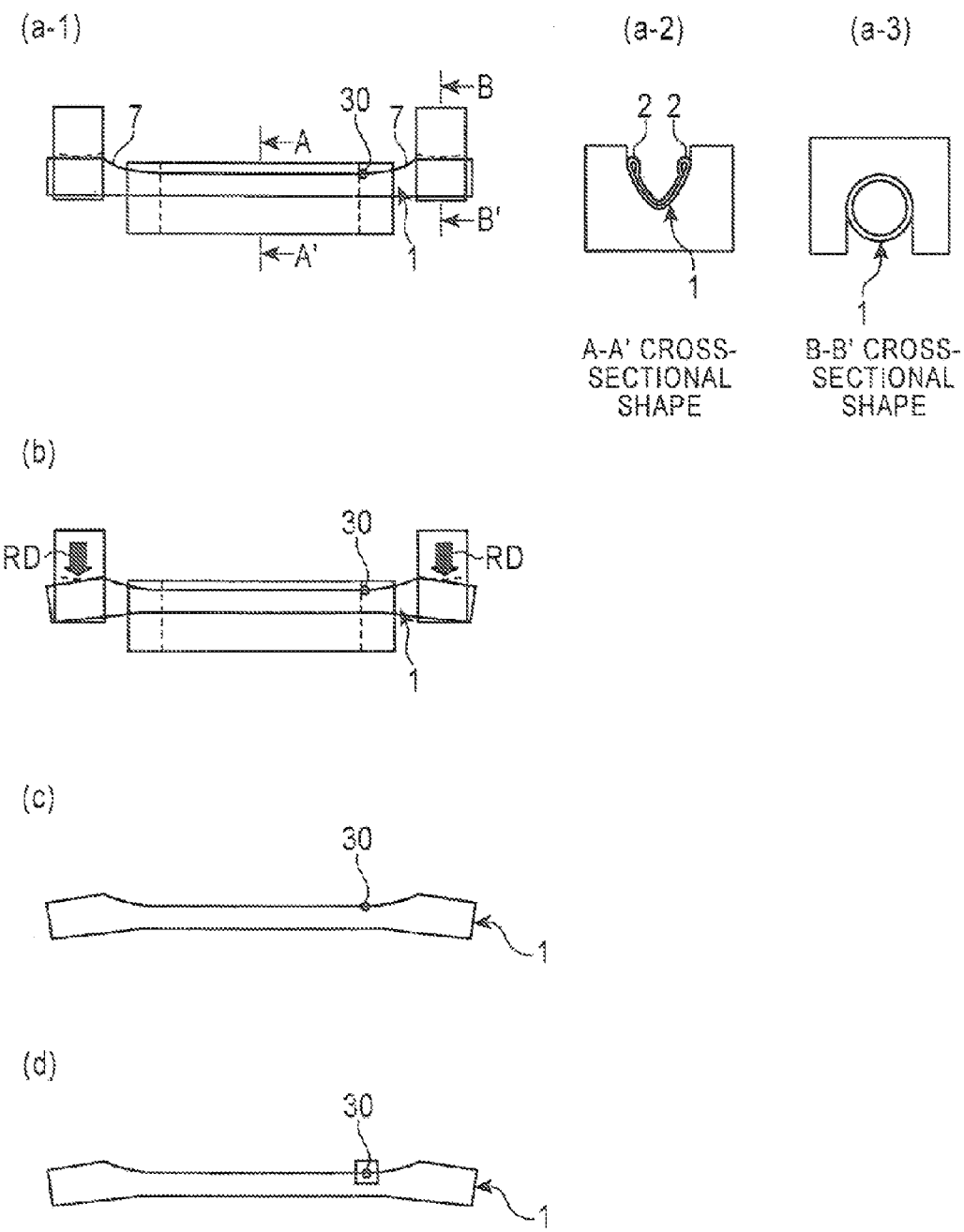
FIG. 17 is an explanatory view showing a bending straightening (bending with a bottom line set as an inner side of bending) method and a measuring method of a bending strain and a residual stress.

FIG. 17 shows one example of an off line bending straightening method and a measuring method of a bending strain and a residual stress. This example corresponds to a measurement performed in a second step shown in FIG. 5(b) where a bent part shape is obtained, and a material which becomes an object is a tubular body of 690 MPa class which has a raw-tube size of ϕ89.1 mm×t2.6 mm×L1300 mm. A strain gauge 30 is adhered to the ear portion 7 of the gradually changing portion of the tubular body 1, the tubular body 1 is set to a bending straightening device having a center die and pressing dies on both end sides (FIG. 17(a) (tube set)) and, then, both tube end portions are pressed by the pressing dies (pressing amount=bending straightening amount; FIG. 17(b) (bending straightening)). After a load is removed, εmax (=εb) is measured based on an output of the strain gauge 30 (FIG. 17(c)) and, further, a residual stress (maximum principal stress) σmax (=σ) is measured using a cut-out method (FIG. 17(d) (residual stress measurement)) and, based on the residual stress and YS which is separately obtained from the residual stress, γ is calculated using the above-mentioned formula of a residual stress ratio.

The relationship between a residual stress ratio γ obtained by changing a bending straightening amount and a residual plastic bending strain εb and a bending strain εa on a tensile side geometrically calculated based on a shape before the removal of a load is shown in FIG. 18. In FIG. 18, 1μ strain is $10^{-6}$, that is, $10^{-4}\%$ (1μ strain=$10^{-6}$=$10^{-4}\%$).

As shown in FIG. 18, it is understood that when εa is 2% or more (ε being approximately 0.2% or more), γ≦50% is satisfied with a margin. Further, when εa is approximately 4% or more (εb being approximately 0.4% or more), γ assumes a negative value, that is, σmax is shifted from a tensile side to a compression side. Hence, it is understood that a characteristic which is further advantageous in view of a torsion fatigue characteristic (characteristic exceeding part performance of a strain-removed annealed material) can be imparted.

Example 1

As Example 1, torsion beams were manufactured by forming tubular bodies made of raw tubes (tubes in raw configuration being circular tubes) shown in Table 1 under different forming conditions shown in Table 2 in the example shown in FIG. 1 or FIG. 2, and endurance lifetimes (the number of times) of these torsion beams were investigated by carrying out a fatigue test substantially equal to the above-mentioned fatigue test on the manufactured torsion beams. The result of the test is shown in Table 2. From Table 2, it is understood that our Examples exhibit extremely long endurance lifetimes compared to Comparison Examples, and no defective shape is found in our Examples.

Example 2

As Example 2, torsion beams were manufactured by forming tubular bodies of raw tubes (tubes in raw configuration being circular tubes) shown in Table 1 under different forming conditions shown in Table 3 in the example of any one of the above-mentioned methods (2) to (9), and endurance lifetimes (the number of times) were investigated by carrying out a fatigue test substantially equal to the above-mentioned fatigue test on the manufactured torsion beams. The result of the test is shown in Table 3-1 to Table 3-4.

From Table 3-1 to Table 3-4, it is understood that our Examples exhibit extremely long endurance lifetimes compared to the Comparison Examples, and no defective shape is found in our Examples. Further, the result of the above-mentioned γ obtained using the above-mentioned measuring method is also shown in Table 3-1 to Table 3-4. In our Examples, γ is suppressed to 50% or less.

TABLE 1

| raw tube | tensile strength (Mpa) | outer diameter (mm) | wall thickness (mm) | length (mm) |
|---|---|---|---|---|
| A | 690 | 89.1 | 2.6 | 1100 |
| B | 780 | 101.6 | 3.4 | 1200 |

TABLE 2

| No. | raw tube | type of torsion beam | bending strain ϵ on tensile side (%) | endurance lifetime (the number of times) | remarks |
|---|---|---|---|---|---|
| 1 | A | straight part | 5.8 | 120691 | Example |
| 2 | A | straight part | 0 | 25685 | Comparison Example |
| 3 | A | straight part | 8.2 | not good due to defective shape | Comparison Example |
| 4 | B | bent part | 2.5 | 98626 | Example |
| 5 | B | bent part | 0 | 18698 | Comparison Example |

TABLE 3-1

| No. | raw tube | example | fluid pressure | type of torsion beam | ϵ a (%) | ϵ b (%) | endurance lifetime (the number of times) | γ (%) | remarks |
|---|---|---|---|---|---|---|---|---|---|
| 1 | A | (2) | — | straight part | 4.0 | 0.36 | 110684 | 12 | Example |
| 2 | A | (2*) | — | straight part | 0.8 | 0.03 | 26053 | 63 | Comparison Example |
| 3 | A | (2*) | — | straight part | 0 | 0 | 25703 | 75 | Comparison Example |
| 4 | A | (3) | — | straight part | 5.7 | 0.59 | 121369 | −28 | Example |
| 5 | A | (3*) | — | straight part | 1.1 | 0.05 | 26221 | 58 | Comparison Example |
| 6 | A | (4) | — | straight part | 5.1 | 0.52 | 122358 | −20 | Example |
| 7 | A | (4*) | — | straight part | 1.7 | 0.13 | 28846 | 54 | Comparison Example |
| 8 | A | (4*) | — | straight part | 8.9 | -not good due to defective shape- | | | Comparison Example |
| 9 | B | (4) | — | bent part | 2.3 | 0.22 | 64123 | 46 | Example |

TABLE 3-2

| No. | raw tube | example | fluid pressure | type of torsion beam | ϵ a (%) | ϵ b (%) | endurance lifetime (the number of times) | γ (%) | remarks |
|---|---|---|---|---|---|---|---|---|---|
| 10 | B | (4*) | — | bent part | 0 | 0 | 19356 | 71 | Comparison Example |
| 11 | A | (5) | — | straight part | 6.0 | 0.62 | 123250 | −30 | Example |
| 12 | A | (5*) | — | straight part | 1.0 | 0.04 | 26982 | 61 | Comparison Example |
| 13 | A | (5*) | — | straight part | 9.9 | -not good due to defective shape- | | | Comparison Example |
| 14 | B | (5) | — | bent part | 4.8 | 0.43 | 112698 | 11 | Example |
| 15 | B | (5*) | — | bent part | 9.5 | -not good due to defective shape- | | | Comparison Example |
| 16 | A | (6) | — | straight part | 5.6 | 0.55 | 119555 | −23 | Example |
| 17 | A | (6*) | — | straight part | 1.5 | 0.09 | 26863 | 57 | Comparison Example |

TABLE 3-3

| No. | raw tube | example | fluid pressure | type of torsion beam | ϵ a (%) | ϵ b (%) | endurance lifetime (the number of times) | γ (%) | remarks |
|---|---|---|---|---|---|---|---|---|---|
| 18 | A | (7) | — | straight part | 3.5 | 0.32 | 89069 | 36 | Example |
| 19 | A | (7*) | — | straight part | 1.3 | 0.08 | 25863 | 59 | Comparison Example |
| 20 | B | (8) | (2)1 | bent part | 4.0 | 0.37 | 111021 | 13 | Example |
| 21 | B | (8) | (3)1 | bent part | 5.7 | 0.69 | 125217 | −27 | Example |
| 22 | A | (8) | (4)1 | straight part | 5.1 | 0.52 | 122368 | −21 | Example |
| 23 | B | (8) | (5)1 | bent part | 6.0 | 0.62 | 125784 | −31 | Example |
| 24 | B | (8) | (5)2 | bent part | 4.8 | 0.42 | 111098 | 10 | Example |
| 25 | B | (8) | (6)1 | bent part | 5.6 | 0.55 | 118973 | −22 | Example |

TABLE 3-4

| No. | raw tube | example | fluid pressure | type of torsion beam | εa (%) | εb (%) | endurance lifetime (the number of times) | γ (%) | remarks |
|---|---|---|---|---|---|---|---|---|---|
| 26 | B | (8) | (7)1 | bent part | 2.1 | 0.21 | 50788 | 49 | Example |
| 27 | A | (9) | 1 | straight part | 4.5 | 0.42 | 100326 | 28 | Example |
| 28 | A | (9) | 2 | straight part | 4.4 | 0.41 | 90463 | 29 | Example |

Note
εa: bending strain (%) on tensile side geometrically calculated based on shape before removal of load
εb: residual plastic bending strain (%) after removal of load
γ: residual stress ratio = σ/YS × 100(%)
In the column designating the examples:
(N): forming using our methods (N),
(N*): forming such that εa falls outside the scope of our methods (N)
In the column indicating fluid pressure:
—: fluid pressure not applied,
(N): fluid pressure is also applied in (N)
1: Fluid pressure being applied to the inside of the tubular body in a stage ranging from holding a state where bending (bending straightening) is applied to the tubular body with the bottom line set as the inner side of bending to the removal of a load.
2: the fluid pressure being applied to the inside of the tubular body in stages ranging from a stage before starting forming the tubular body 1 to the removal of the load after the bending straightening (in all stages of forming).

The invention claimed is:

1. A method of manufacturing a torsion beam comprising:
    forming a portion of a tubular body into an approximately U-shape in cross section or an approximately V-shape in cross section by crushing a portion of the tubular body in the radial direction and, thereafter,
    bending the tubular body with a bottom line of the tubular body set as an inner side of bending so that a bending strain of 2 to 6% in a longitudinal direction of the tube on a tensile side is imparted to ear portions,
    wherein, by using a vertically movable ship-bottom-shaped upper die where upward tapered portions are contiguously formed with both ends of an upper horizontal portion, upper clamps which are arranged on both end sides of the upper die in a vertically movable manner, and a fixed lower die where downward tapered portions are contiguously formed with both ends of an lower horizontal portion, a portion of the tubular body is formed into an approximately U-shape in cross section or an approximately V-shape in cross section by crushing a portion of the tubular body in the radial direction by the upper die and the lower die and, thereafter, both tube end portions are clamped and bent by the upper clamps and the downward tapered portions of the lower die with the bottom line set as the inner side of bending and, due to the bending, a bending strain, of 2 to 6% in the tube longitudinal direction on a tensile side is imparted to the ear portions of gradually changing portions.

2. The method according to claim 1, wherein at least in a final stage of forming, that is, in a stage ranging from holding a state where bending is applied to the tubular body with the bottom line set as the inner side of bending to the removal of a load, a fluid pressure is applied to the inside of the tubular body.

3. A torsion beam manufactured from a raw tube using the method according to claim 1, wherein a residual stress σ which is defined by a maximum value, of maximum principal stress within an ear lobule shape forming range in an ear portion of a gradually changing portion of the torsion beam is suppressed to 50% or less with respect to a yield stress YS of the raw tube.

4. The method according to claim 1, wherein a tube longitudinal center portion of the tubular body is preliminarily formed into an approximately inverted-triangular-shape in cross section and, at the same time, preshaping which applies warp deformation to tube ends in the direction that a bottom of the portion formed into an approximately V-shape in cross section projects downward is performed and, thereafter,
    using the vertically movable ship-bottom-shaped upper die where the upward tapered portions are contiguously formed with both ends of the upper horizontal portion, the upper clamps which are arranged on both end sides of the upper die in a vertically movable manner, and the fixed lower die where the downward tapered portions are contiguously formed with both ends of the lower horizontal portion,
    a portion of the tubular body is formed into an approximately U-shape in cross section or an approximately V-shape in cross section by crushing the portion of the tubular body in the radial direction by the upper die and the lower die and, thereafter, both tube end portions are clamped and bent by the upper clamps and the downward tapered portions of the lower die with the bottom line set as the inner side of bending and, due to the bending, a bending strain of 2 to 6% in the tube longitudinal direction on a tensile side is imparted to the ear portions of the gradually changing portions.

5. The method according to claim 1, wherein by using the vertically movable ship-bottom-shaped upper die where the upward tapered portions are contiguously formed with both ends of the upper horizontal portion, the upper clamps which are arranged on both end sides of the upper die in a vertically movable manner, the fixed lower die where the downward tapered portions are contiguously formed with both ends of the lower horizontal portion, and warp accelerating advancing/retracting dies having a tapered shape which are arranged on both end sides of the lower die, a portion of the tubular body is formed into an approximately U-shape in cross section or an approximately V-shape in cross section by crushing the portion of the tubular body in the radial direction by the upper die and the lower die and, at the same time, warp deformation is applied to the tubular body in the direction that a tube center portion projects downward by three points bending by the upper die and the advanced warp accelerating advancing/retracting dies and, thereafter, the upper die is released and the warp accelerating advancing/retracting dies are retracted and, next, both tube end portions are clamped and bent by the upper clamps and the downward tapered portions while clamping the tube center portion by the upper and lower dies with the bottom line set as the inner side of bending and, due to the bending, a bending strain of 2 to 6% in the tube longitudinal direction on a tensile side is imparted to the ear portions of the gradually changing portions.

6. The method according to claim 1, wherein using the vertically movable ship-bottom-shaped upper die where the upward tapered portions are contiguously formed with both ends of the upper horizontal portion, upper clamps which are arranged on both end sides of the upper die in art interlocking manner with the upper die and in an advanceable and retractable manner to and from the upper die, and the fixed lower die where the downward tapered portions are contiguously formed with both ends of the lower horizontal portion, in a state where the upper clamps are retracted, a portion of the tubular body is crushed in the radial direction by the upper die and the lower die thus applying warp deformation to the tubular body in the direction that a tube center portion projects downward while forming the portion of the tubular body into an approximately U-shape in cross section or an approximately V-shape in cross section and, thereafter, the upper die is elevated and the upper clamps are advanced and, next, the upper die is lowered so that both tube end portions are clamped and bent by the upper clamps and the downward tapered portions while damping the tube center portion by the upper and lower dies with the bottom line set as the inner side of bending and, due to the bending, a bending strain of 2 to 6% in the tube longitudinal direction on a tensile side is imparted to the ear portions of the gradually changing portions.

7. The method according to claim 1, wherein at least in a final stage of forming, that is, in a stage ranging from holding a state where bending is applied to the tubular body with the bottom line set as the inner side of bending to the removal of a load, a fluid pressure is applied to the inside of the tubular body.

8. A method of manufacturing a torsion beam comprising:
forming a portion of a tubular body into an approximately U-shape in cross section or an approximately V-shape in cross section by crushing a portion of the tubular body in the radial direction and, thereafter,
bending the tubular body with a bottom line of the tubular body set as an inner side of bending so that a bending strain of 2 to 6% in a longitudinal direction of the tube on a tensile side is imparted to ear portions,
wherein a tube longitudinal center portion of the tubular body is preliminarily formed into an approximately inverted-triangular-shape in cross section and, at the same time, preshaping which applies warp deformation to tube ends in the direction that a bottom of the portion formed into an approximately V-shape in cross section projects downward is performed and, thereafter,
using the vertically movable ship-bottom-shaped upper die where the upward tapered portions are contiguously formed with both ends of the upper horizontal portion, the upper clamps which are arranged on both end sides of the upper die in a vertically movable manner, and the fixed lower die where the downward tapered portions are contiguously formed with both ends of the lower horizontal portion, a portion of the tubular body is formed into an approximately U-shape in cross section or an approximately V-shape in cross section by crushing the portion of the tubular body in the radial direction by the upper die and the lower die and, thereafter, both tube end portions are clamped and bent by the upper clamps and the downward tapered portions of the lower die with the bottom line set as the inner side of bending and, due to the bending, a bending strain of 2 to 6% in the tube longitudinal direction on a tensile side is imparted to the ear portions of the gradually changing portions.

9. The method according to claim 8, wherein at least in a final stage of forming, that is, in a stage ranging from holding a state where bending is applied to the tubular body with the bottom line set as the inner side of bending to the removal of a load, a fluid pressure is applied to the inside of the tubular body.

10. A method of manufacturing a torsion beam comprising:
forming a portion of a tubular body into an approximately U-shape in, cross section or an approximately V-shape in cross section by crushing a portion of the tubular body in the radial direction and, thereafter,
bending the tubular body with a bottom line of the tubular body set as an inner side of bending so that a bending strain of 2 to 6% in a longitudinal direction of the tube on a tensile side is imparted to ear portions,
wherein, by using a vertically movable ship-bottom-shaped upper die where upward tapered portions are contiguously formed with both ends of an upper horizontal portion, upper clamps which are arranged on both and sides of the movable upper die in a vertically movable manner, a vertically movable lower die where vertical portions are contiguously formed with both ends of a lower horizontal portion, and lower clamps which are arranged on both end sides of the lower die in a fixed manner, a portion of the tubular body is formed into an approximately U-shape in cross section or an approximately V-shape in cross section by crushing the portion of the tubular body in the radial direction by the upper die and the lower die and, at the same time, warp deformation is applied to the tubular body in the direction that a tube center portion projects downward by three points bending by the upper die and the lower clamps and thereafter, both tube end portions are clamped by the upper clamps and the lower clamps and, at the same time, the upper and lower dies are elevated with respect to the lower clamps while maintaining the tube center portion in a clamped state thus applying bending to the tubular body with the bottom line set as the inner side of bending and, due to the bending, a bending strain of 2 to 6% in the tube longitudinal direction on a tensile side is imparted to ear portions of gradually changing portions.

11. The method according to claim 10, wherein at least in a final stage of forming, that is, in a stage ranging from holding a state where bending is applied to the tubular body with the bottom line set as the inner side of bending to the removal of a load, a fluid pressure is applied to the inside of the tubular body.

12. A method of manufacturing a torsion beam comprising:
forming a portion of a tubular bud into an approximately U-shape in cross section or an approximately V-shape in cross section by crushing a portion of the tubular body in the radial direction and, thereafter,
bending the tubular body with a bottom line of the tubular body set as an inner side of bending so that a bending strain of 2 to 6% in a longitudinal direction of the tube on a tensile side is imparted to ear portions,
wherein, by using a vertically movable ship-bottom-shaped upper die where upward tapered portions are contiguously formed with both ends of an upper horizontal portion, upper clamps which are arranged on both end sides of the upper die in a vertically movable manner, a fixed lower die where vertical portions are contiguously formed with both ends of a lower horizontal portion, and warp accelerating rotary dies which are arranged on both end sides of the lower die, a portion of the tubular body is formed into an approximately U-shape in cross section or an approximately V-shape in cross section by crushing the portion of the tubular body in the radial direction by the upper die and the lower die and, at the same time, warp deformation is applied to the tubular body in the direction that a tube center portion projects downward by three points bending by the upper die and the warp accelerating rotary dies in an upwardly rotating state and, thereafter, both tube end portions are clamped and bent by the upper clamps and the warp accelerating rotary dies in a downwardly rotating state with the bottom line set as the inner side of bending and, due to the bending, a bending strain of 2 to 6% in the tube longitudinal direction on a tensile side is imparted to ear portions of gradually changing portions.

13. The method according to claim 12, wherein at least in a final stage of forming, that is, in a stage ranging from holding a state where bending is applied to the tubular body with the bottom line set as the inner side of bending to the removal of a load, a fluid pressure is applied to the inside of the tubular body.

14. A method of manufacturing a torsion beam comprising:
forming, a portion of a tubular body into an approximately U-shape in cross section or an approximately V-shape in cross section by crushing a portion of the tubular body in the radial direction and, thereafter,
bending the tubular body with a bottom line of the tubular body set as an inner side of bending so that a bending strain of 2 to 6% in a longitudinal direction of the time on a tensile side is imparted to ear portions,
wherein, by using the vertically movable ship-bottom-shaped upper die where the upward tapered portions are contiguously formed with both ends of the upper horizontal portion, the upper clamps which are arranged on both end sides of the upper die in a vertically movable manner, the fixed lower die where the downward tapered portions are contiguously formed with both ends of the lower horizontal portion, and warp accelerating advancing/retracting dies having a tapered shape which are arranged on both end sides of the lower die, a portion of the tubular body is formed into an approximately U-shape in cross section or an approximately V-shape in cross section by crushing the portion of the tubular body in the radial direction by the upper die and the lower die and, at the same time, warp deformation is applied to the tubular body in the direction that a tube center portion projects downward by three points bending by the upper die and the advanced warp accelerating advancing/retracting dies and, thereafter, the upper die is released and the warp accelerating advancing/retracting dies are retracted and, next, both tube end portions are clamped and bent by the upper clamps and the downward tapered portions while clamping the time center portion by the upper and lower dies with the bottom line set as the inner side of bending and, due to the bending, a bending strain of 2 to 6% in the tube longitudinal direction on a tensile side is imparted to the ear portions of the gradually changing portions.

15. The method according to claim 14, wherein at least in a final stage of forming, that is, in a stage ranging from holding a state where bending is applied to the tubular body with the bottom line set as the inner side of bending to the removal of a load, a fluid pressure is applied to the inside of the tubular body.

16. A method of manufacturing a torsion beam comprising:
forming a portion of a tubular body into an approximately U-shape in cross section or an approximately V-shape in cross section by crushing a portion of the tubular body in the radial direction and, thereafter,
bending the tubular body with a bottom line of the tubular body set as an inner side of bending so that a bending strain of 2 to 6% in a longitudinal direction of the tube on a tensile side is imparted to car portions,
wherein using the vertically movable ship-bottom-shaped upper die where the upward tapered portions are contiguously formed with both ends of the upper horizontal portion, upper clamps which are arranged on both end sides of the upper die in an interlocking manner with the upper die and in an advanceable and retractable manner to and from the upper die, and the fixed lower die where the downward tapered portions are contiguously formed with both ends of the lower horizontal portion,
in a state where the upper clamps are retracted, a portion of the tubular body is crushed in the radial direction by the upper die and the lower die thus applying warp deformation to the tubular body in the direction that a tube center portion projects downward while forming the portion of the tubular body into an approximately U-shape in cross section or an approximately V-shape in cross section and, thereafter, the upper die is elevated and the upper clamps are advanced and, next, the upper die is lowered so that both tube end portions are clamped and bent by the upper clamps and the downward tapered portions while clamping the tube center portion by the upper and lower dies with the bottom line set as the inner side of bending and, due to the bending, a bending strain of 2 to 6% in the tube longitudinal direction on a tensile side is imparted to the ear portions of the gradually changing portions.

17. The method according to claim 16, wherein at least in a final stage of forming, that is, in a stage ranging from holding a state where bending is applied to the tubular body with the bottom line set as the inner side of bending to the removal of a load, a fluid pressure is applied to the inside of the tubular body.

18. A method of manufacturing a torsion beam comprising:
forming a portion of a tubular body into an approximately U-shape in cross section or an approximately V-shape in cross section by crushing a portion of the tubular body in the radial direction and, thereafter,
bending the tubular body with a bottom line of the tubular body set as an inner side of bending so that a bending strain of 2 to 6% in a longitudinal direction of the tube on a tensile side is imparted to ear portions,
wherein in a step where, using a vertically movable ship-bottom-shaped upper die where upward tapered portions are contiguously formed with both ends of an upper horizontal portion, upper clamps which are arranged on both end sides of the upper die in a vertically movable manner, and a fixed lower die where a lower horizontal portion has a length of a range equal to or larger than a length of the tubular body,
in a state where the upper clamps are elevated, a portion of the tubular body is crushed in the radial direction by the upper die and the lower die thus applying warp deformation to the tubular body to the direction that a tube center portion projects downward while forming the portion of the tubular body into an approximately U-shape in cross section or an approximately V-shape in cross section and, thereafter, both tube end portions are clamped and bent by the upper clamps and the lower die with the bottom line set as the inner side of bending and, due to the bending, a bending strain of 2 to 6% in the tube longitudinal direction on a tensile side is imparted to ear portions of gradually changing portions,
at least in a final stage of forming, that is, in a stage ranging from holding a state where bending is applied to the tubular body with the bottom line set as the inner side of bending to the removal of a load, a fluid pressure is applied to the inside of the tubular body.

* * * * *

UNITED STATES PATENT AND TRADEMARK OFFICE
CERTIFICATE OF CORRECTION

| | | |
|---|---|---|
| PATENT NO. | : 8,505,941 B2 | Page 1 of 1 |
| APPLICATION NO. | : 13/260828 | |
| DATED | : August 13, 2013 | |
| INVENTOR(S) | : Hashimoto et al. | |

It is certified that error appears in the above-identified patent and that said Letters Patent is hereby corrected as shown below:

In the Claims

In Column 24

In Claim 16, line 6, please change "car" to -- ear --.

Signed and Sealed this
Ninth Day of September, 2014

Michelle K. Lee
*Deputy Director of the United States Patent and Trademark Office*